(12) United States Patent
Pratt et al.

(10) Patent No.: US 8,233,518 B2
(45) Date of Patent: Jul. 31, 2012

(54) SIGNALS, SYSTEM, METHOD AND APPARATUS

(75) Inventors: Anthony R. Pratt, Northants (GB); John I. R. Owen, Farnborough (GB)

(73) Assignee: The Secretary of State for Defence in Her Britannic Majesty's Government of the United Kingdom of Great Britain and Northern Ireland (GB)

(*) Notice: Subject to any disclaimer, the term of this patent is extended or adjusted under 35 U.S.C. 154(b) by 507 days.

(21) Appl. No.: 12/305,401

(22) PCT Filed: Jun. 20, 2007

(86) PCT No.: PCT/GB2007/002293
§ 371 (c)(1),
(2), (4) Date: Apr. 1, 2009

(87) PCT Pub. No.: WO2007/148081
PCT Pub. Date: Dec. 27, 2007

(65) Prior Publication Data
US 2009/0279592 A1    Nov. 12, 2009

(30) Foreign Application Priority Data
Jun. 20, 2006 (GB) .................................. 0612142.0

(51) Int. Cl.
*H04B 1/00* (2006.01)
(52) U.S. Cl. ........................................................ 375/146
(58) Field of Classification Search .................. 375/130, 375/148–149, 295, 316, 340, 146
See application file for complete search history.

(56) References Cited

U.S. PATENT DOCUMENTS

| 4,716,385 | A | 12/1987 | Noda et al. |
| 4,761,795 | A | 8/1988 | Beier |
| 4,816,783 | A | 3/1989 | Leitch |
| 5,133,083 | A | 7/1992 | Crilly et al. |
| 5,684,833 | A | 11/1997 | Watanabe et al. |
| 5,717,722 | A | 2/1998 | Mori |

(Continued)

FOREIGN PATENT DOCUMENTS
EP    0458385    11/1991
(Continued)

OTHER PUBLICATIONS

Avila-Rodriguez, et al., 'Revised Combined Galileo/GPS Frequency and Signal Performance Analysis,' Proceedings of the 18th International Technical Meeting of the Satellite Division of the Institute of Navigation ION GNSS 2005, (Sep. 13-16, 2005) Long Beach, California USA, pp. 846-860.

(Continued)

*Primary Examiner* — Khanh C Tran
(74) *Attorney, Agent, or Firm* — Dean W. Russell; Kilpatrick Townsend & Stockton LLP

(57) ABSTRACT

Embodiments of the present invention provide a method to produce a modulation signal comprising combining at least two modulation signals, for example, BOCs or derivatives thereof, having portions (chip or a number of chips) thereof with respective relative phases or states ({++, --} and {+-, -+}) selected such that the average of a plurality of said portions at least reduces cross spectral terms of the composite complex spectrum of said at least two modulation signals.

23 Claims, 11 Drawing Sheets

U.S. PATENT DOCUMENTS

| | | | |
|---|---|---|---|
| 5,729,570 | A | 3/1998 | Magill |
| 5,745,535 | A | 4/1998 | Mori |
| 6,052,701 | A | 4/2000 | Koslov et al. |
| 6,301,306 | B1 | 10/2001 | McDonald et al. |
| 6,430,213 | B1 | 8/2002 | Dafesh |
| 7,120,198 | B1 | 10/2006 | Dafesh et al. |
| 7,272,416 | B2 | 9/2007 | Sano et al. |
| 7,418,043 | B2 | 8/2008 | Shattil |
| 7,583,759 | B2 | 9/2009 | Moulthrop et al. |
| 7,668,253 | B2 | 2/2010 | Hwang et al. |
| 7,860,151 | B2 * | 12/2010 | Djuknic et al. ............... 375/146 |
| 2002/0070799 | A1 | 6/2002 | Dahan et al. |
| 2003/0141938 | A1 | 7/2003 | Poklemba et al. |
| 2003/0152387 | A1 | 8/2003 | Duling et al. |
| 2007/0047637 | A1 | 3/2007 | Lee |
| 2007/0176676 | A1 | 8/2007 | Pratt et al. |
| 2008/0063119 | A1 | 3/2008 | Pratt et al. |
| 2008/0137714 | A1 * | 6/2008 | Lionel et al. .................. 375/130 |
| 2008/0262726 | A1 * | 10/2008 | Hoult ............................ 701/213 |
| 2010/0074302 | A1 * | 3/2010 | Hoult ............................ 375/130 |
| 2011/0013675 | A1 * | 1/2011 | Issler et al. .................... 375/150 |

FOREIGN PATENT DOCUMENTS

| | | |
|---|---|---|
| EP | 0780974 | 6/1997 |
| EP | 1021019 | 7/2000 |
| EP | 16664872 | 6/2006 |
| GB | 0320352 | 9/2004 |
| WO | WO0110070 | 2/2001 |
| WO | WO 2005022186 | 3/2005 |

OTHER PUBLICATIONS

Betz, 'Binary Offset Carrier Modulation for Radionavigation,' Navigation, 48(4):227-246 (Winter 2001-2002).

Hein, et al., 'MBOC: The New Optimized Spreading Modulation Recommended for Galileo L1 OS and GPS L1C,' Position, Location, and Navigation Symposium, 2006 IEEE-ION Coronado, California, Piscataway, New Jersey, USA, IEEE, Apr. 25-27, 2006, pp. 883-892.

Pratt, et al., 'Tracking Complex Modulation Waveforms—How to Avoid Receiver Bias,' Position, Location, and Navigation Symposium, 2006 IEEE-ION Coronado, California, Piscataway, New Jersey, USA, IEEE, Apr. 25, 2006, pp. 853-864.

Pratt, et al., 'Controlling the Galileo L1 OS Signal Emissions with Satellite Baseband Filters,' Position, Location, and Navigation Symposium, 2006 IEEE-ION Coronado, California, Piscataway, New Jersey, USA, IEEE, Apr. 25-27, 2006, pp. 865-875.

Pratt, et al., 'Signal Multiplex Techniques in Satellite Channel Availability—Possible Applications to Galileo,' ION GNSS 18$^{th}$ International Technical Meeting of the Satellite Division [Online] Sep. 13, 2005, pp. 2448-2460, XP002454325, Retrieved from the Internet: URL:http://www.ion.org/search/purchase_paper.cfm?jp=p&id=6452> [retrieved on Oct. 10, 2007].

Pratt, et al., 'Galileo Signal Optimisation in L1,' Proceedings of the Institute of Navigation 2005 National Technical Meeting NTM 2005, Jan. 24-26, Conference Record, National Technical Meeting, Institute of Navigation, pp. 332-345, San Diego, California.

Pratt and Owen, "BOC Modulation Waveforms," ION GPS/GNSS Portland, OR, (Sep. 9-12, 2003), pp. 1044-1057.

Hein, et al., "Status of Galileo Frequency and Signal Design," Galileo (Publication 2002), 13 pages.

Ries, et al., "A Software Simulation Tool for GNSS2 BOC Signals Analysis," Proceedings of the Institute of Navigation, pp. 2225-2239, Sep. 2002.

Betz, "The Offset Carrier Modulation for GPS Modernization," Proceedings of the National Technical Meeting "Vision 2010: Present and Future," The Institute of Navigation, pp. 639-648, Catamaran Hotel, San Diego, California, 1999.

Gentile, "Fundamentals of Digital Quadrature Modulation," 2003:40-47, Feb. 2003.

* cited by examiner

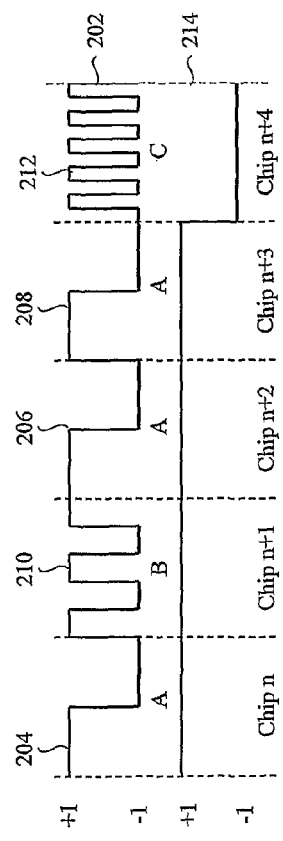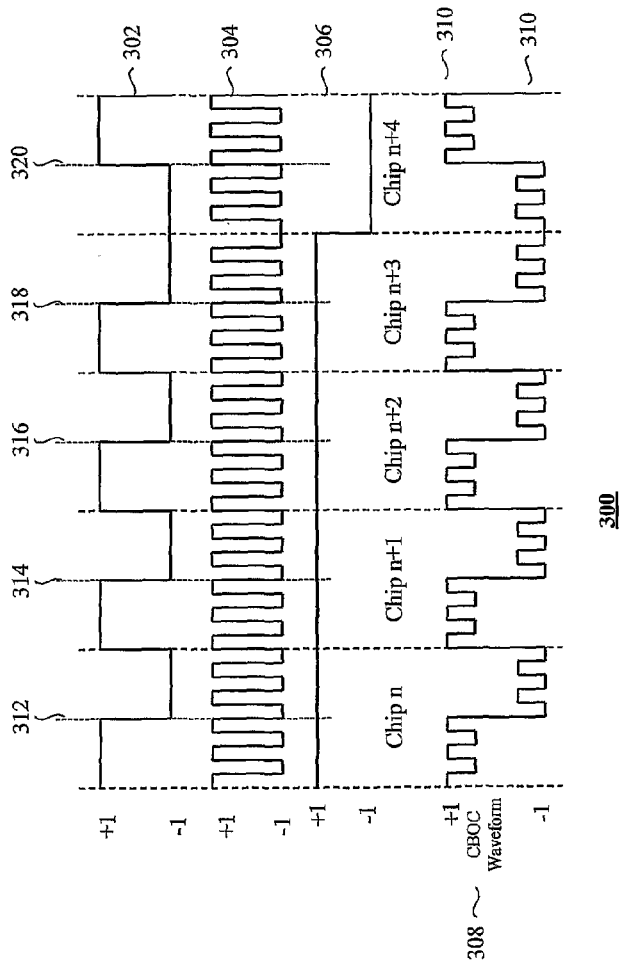

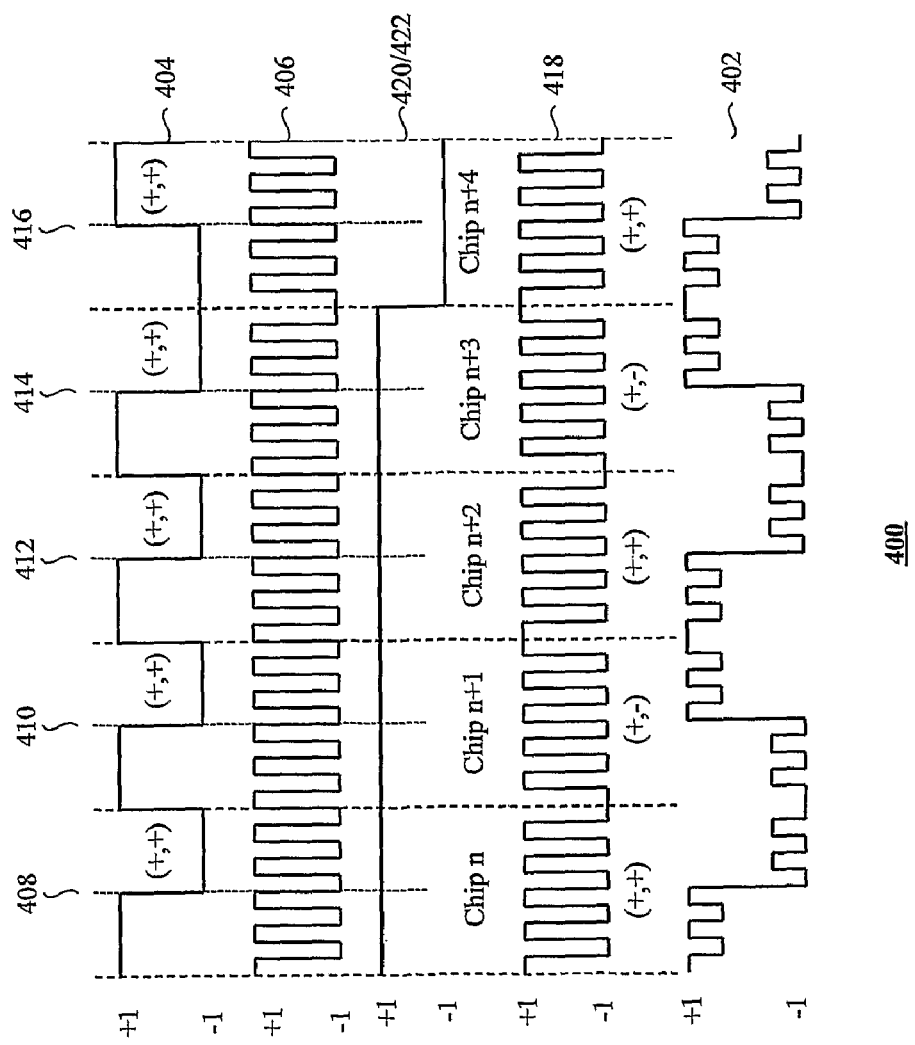

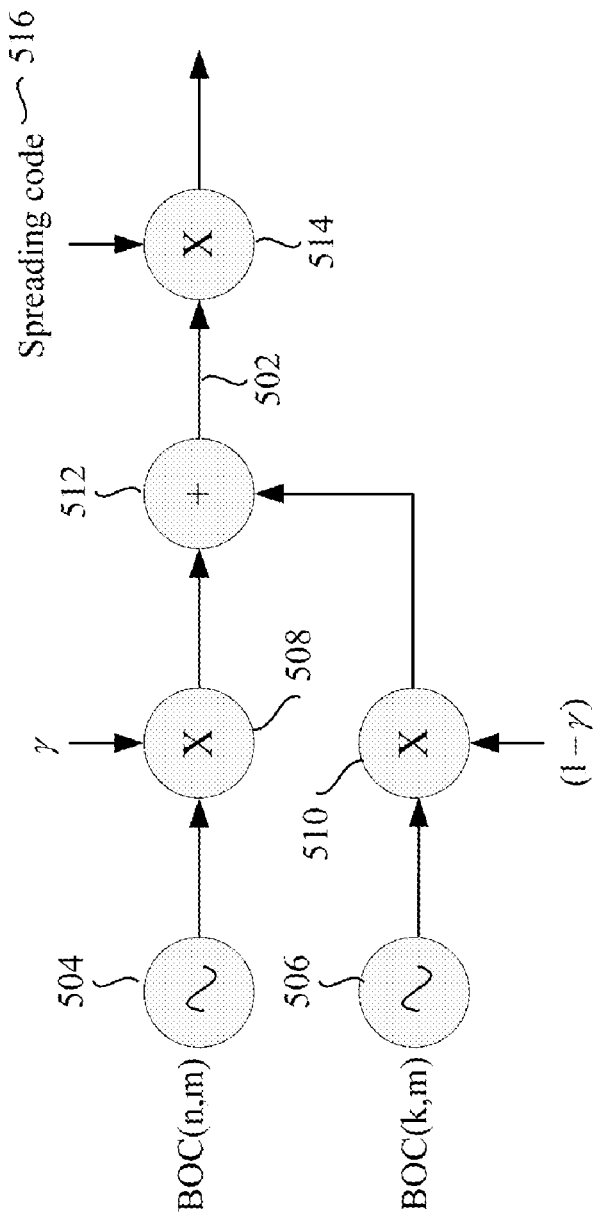

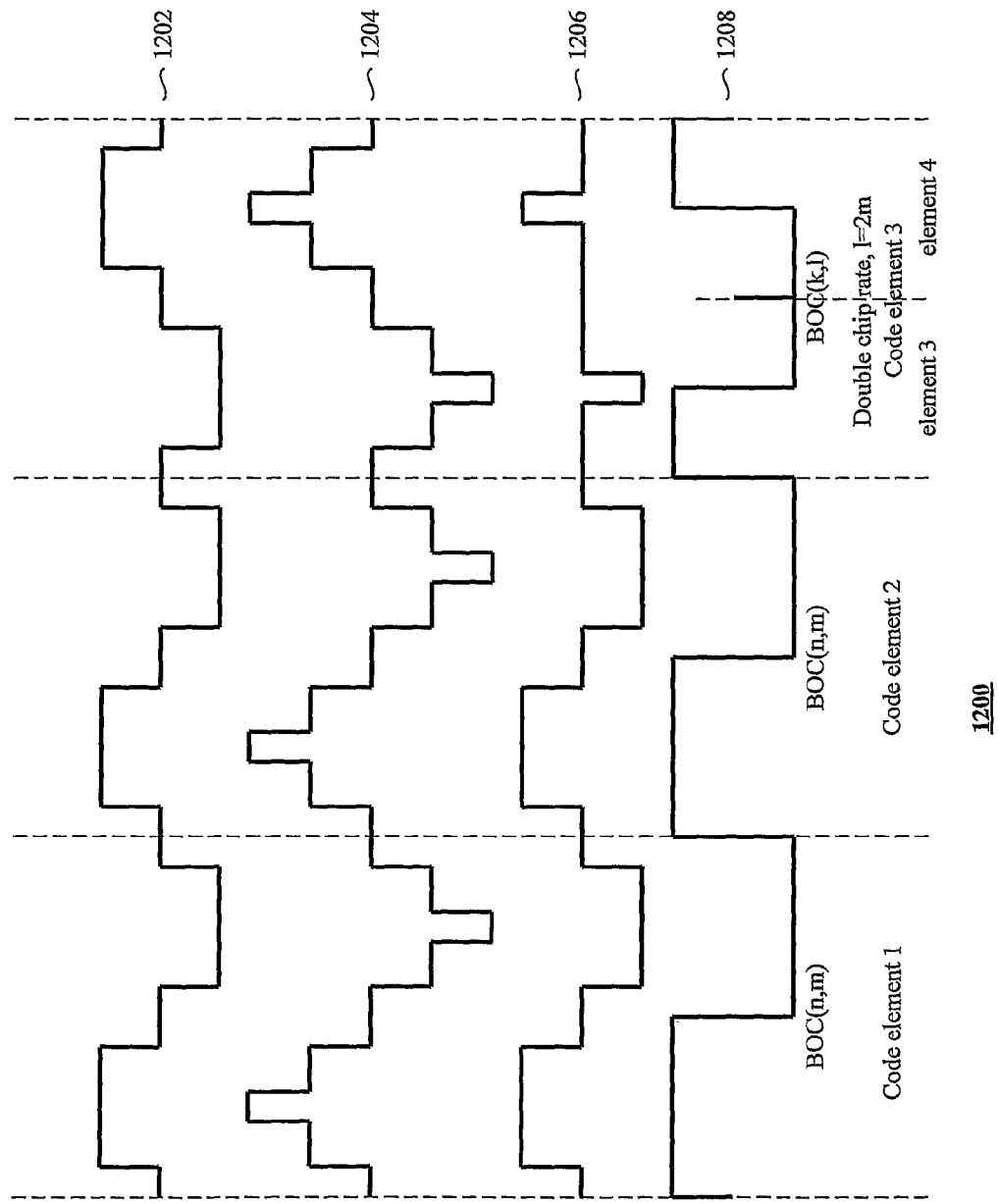

SIGNALS, SYSTEM, METHOD AND APPARATUS

BACKGROUND TO THE INVENTION

Embodiments of the invention relate to signals, systems and methods such as, for example, modulation, navigation and positioning signals, systems methods and receivers adapted to receive and process the same.

Satellite Positioning Systems (SPS) rely on the passive measurement of ranging signals broadcast by a number of satellites, or ground-based or airborne equivalents, in a specific constellation or group of constellations. An on-board clock is used to generate a regular and usually continual series of events, often known as 'epochs', whose time of occurrence is coded into, or at least associated with, a random or pseudo-random code (known as a spreading code). As a consequence of the pseudo-random or random features of the time epoch encoding sequence, the spectrum of the output signal is spread over a frequency range determined by a number of factors including the rate of change of the spreading code elements and the waveform used for the spreading signal. In the prior art, the spreading waveform is rectangular, of constant chipping rate, and has a $(\text{sinc})^2$ function power spectrum, prior to filtering by transmission circuitry.

The ranging signals are modulated onto a carrier signal for transmission to passive receivers. Applications are known that cover land, airborne, marine and space use. Typically, binary phase shift keying is employed to modulate the carrier signal, which, itself, has a constant magnitude. Usually, at least two such signals are modulated onto the same carrier in phase quadrature. The resulting carrier signal retains its constant envelope but has four phase states depending upon the two independent input signals. However, it will be appreciated that the two modulating signals do not need to have the same carrier magnitude. It is possible for a constant carrier magnitude of the combined signal to be maintained by appropriate selection of corresponding phases other than $\pi/2$ radians.

Techniques are known by which more than two signals are modulated onto the same carrier using either additive methods (known as 'Interplex' modulation) or a combination of angle modulation and additive methods, known as 'Coherent Adaptive Sub-carrier Modulation' (CASM). Both of these techniques require the addition of a further inter-modulation component that is derived to maintain constant carrier magnitude. For example, in 'Interplex' modulation, techniques are known with three transmitted components, 2 on one carrier phase with a third on the quadrature phase. These have at least six phase states.

An example of such a satellite positioning system is the Global Positioning System (GPS). Generally, the GPS operates using a number of frequencies such as, for example, L1, L2 and L5, which are centred at 1575.42 MHz, 1227.6 MHz and 1176.45 MHz respectively. Each of these signals is modulated by respective spreading signals. As will be appreciated by those skilled in the art, a Coarse Acquisition (CA) code signal emitted by the GPS Satellite Navigation System is broadcast on the L1 frequency of 1575.42 MHz with a spreading code rate (chip rate) of 1.023 MHz. The CA code signal has a rectangular spreading waveform, is binary phase shift keyed on to the carrier, and is categorised as BPSK-R1. The GPS signal structure is such that the signal broadcast by the satellites on the L1 frequency has a second component in phase quadrature, which is known as the precision code (P(Y) code) and made available to authorised users only. The P(Y) signal is BPSK modulated with a spreading code at 10.23 MHz with a magnitude that is 3 dB lower in signal power than the CA code transmission. Consequently, the Q component has a magnitude that is 0.7071 (−3 dB) of the magnitude of the I component. It will be appreciated by those skilled in the art that the phase angles of these states of these signals are ±35.265° in relation to the ±I axis (phase of the CA code signal as specified in ICD GPS 200C). One skilled in the art also appreciates that the P code is a function of or is encrypted by the Y code. The Y code is used to encrypt the P code. One skilled in the art appreciates that the L1 signal, containing both I & Q components, and the L2 signal can be represented, for a given satellite, i, as $$S_{L1i}(t) = A_P p_i(t) d_i(t) \cos(\omega_1 t) + A_C c_i(t) d_i(t) \sin(\omega_1 t),$$
and $$S_{L2i}(t) = B_P p_i(t) d_i(t) \cos(\omega_2 t)$$

where
$A_P$ and $A_C$ are the amplitudes of the P and CA codes, typically $A_P = 2A_C$;
$B_P$ is the amplitude of the L2 signal;
$\omega_1$ and $\omega_2$ are the L1 and L2 carrier frequencies;
$p_i(t)$ represents the P(Y) ranging code and is a pseudo-random sequence with a chip rate of 10.23 Mcbps. The P code has a period of exactly 1 week, taking values of +1 and −1;
$c_i(t)$ represents the CA ranging code and is a 1023 chip Gold code, taking values of +1 and −1; and
$d_i(t)$ represents the data message, taking values of +1 and −1.

In the near future, it is expected that a third military signal, designated M-code, will be transmitted in the L1 band by GPS satellites.

A satellite constellation typically comprises 24 or more satellites often in similar or similarly shaped orbits but in a number of orbital planes. The transmissions from each satellite are on the same nominal carrier frequency in the case of code division access satellites (such as GPS) or on nearby related frequencies such as GLONASS. The satellites transmit different signals to enable each one to be separately selected even though several satellites are simultaneously visible.

The signals from each satellite, in a CDMA system like GPS, are distinguished from one another by means of the different spreading codes and/or differences in the spreading code rates, that is, the $p_i(t)$ and $c_i(t)$ sequences. Nevertheless, there remains significant scope for interference between the signals transmitted by the satellites. Typically, the power spectrum for the CA code has maximum power at the carrier frequency L1 and zeros at multiples of the fundamental frequency, 1.023 MHz, of the CA code. Therefore, it will be appreciated that zeros occur either side of the carrier frequency at ±1.023 MHz, ±2.046 MHz etc. Similarly, the power spectrum for a the P(Y) code has a maximum amplitude centred on the L1 and L2 frequencies, with zeros occurring at multiples of ±10.23 MHz as is expected with a sinc function waveform.

It is known to further modulate the ranging codes using a sub-carrier, that is, a further signal is convolved with signals similar to the P codes and/or CA codes, to create Binary Offset Carrier (BOC) modulation as can be appreciated from, for example, J. W. Betz, "*Binary Offset Carrier Modulation for Radionavigation*", Navigation, Vol. 48, pp 227-246, Winter 2001-2002, International patent application PCT/GB2004/003745 and "Performance of GPS Galileo Receivers Using m-PSK BOC Signals", Proceedings of Institute of Navigation Conference, 2003. 9-12 Sep. 2003, Portland, Oreg., USA, Pratt, A. R., Owen J. I. R. all of which are incorporated herein by reference. Standard BOC modulation is well-known. The combination of a portion of a binary spreading code with a binary subcarrier signal produces the BOC signal used to modulate a carrier such as, for example, L1. The BOC signal is formed by the product of a binary sub-carrier (known as the spreading symbol modulation), which is rectangular square wave, and the spreading symbols (the sequence of spreading code elements). The BOC spreading symbol modulation can be represented as, for example, $c_i(t)*\text{sign}(\sin(2\pi f_s t))$, where $f_s$ is the frequency of the subcarrier. One skilled in the art understands that BOC($f_s,f_c$) denotes Binary Offset Carrier modulation with a subcarrier frequency of $f_s$ and a code rate (or chipping rate) of $f_c$. Using binary offset carriers results in the following exemplary signal descriptions of the signals emitted from the satellite:

$$S_{L1i}(t) = A_m sc_{im}(t)m_i(t)d_i(t)\cos(\omega_1 t) + A_g sc_{ig}(t)g_i(t)d_i(t)$$
$$\sin(\omega_1 t) = I_{SL1i}(t) + Q_{SL1i}(t), \text{ and}$$

$$S_{L2i}(t) = B_m sc_{im}(t)m_i(t)d_i(t)\cos(\omega_2 t)$$

where
$A_m$, $A_g$ and $B_m$ are amplitudes;
$m_i(t)$ is the spreading code for the in-phase (cosine) component of the signal;
$g_i(t)$ is the spreading code for the quadrature (sine) component of the signal;
$sc_{im}(t)$ represents the sub-carrier signal for $m_i(t)$;
$sc_{ig}(t)$ represents a subcarrier signal for $g_i(t)$;
$\omega_1$ and $\omega_2$ are designated as L1 and L2 carrier frequencies.

It will be appreciated that the embodiment expressed above uses a single component on the in-phase and a single component on the quadrature phase for the L1 signal. Similarly, the L2 signal comprises a single component. However, one skilled in the art appreciates that the L1 and/or L2 signals may use one or more components.

BOC signals are typically rectangular or square waves. However, alternatives have been proposed that involve more complex spreading symbol modulation utilising multiple signal levels as can be appreciated from, for example, International patent application PCT/GB2004/003745, and "*Performance of GPS Galileo Receivers Using m-PSK BOC Signals*", Proceedings of Institute of Navigation Conference, 2003. 9-12 Sep. 2003, Portland, Oreg., USA, Pratt, A. R., Owen S. I. R cited above. These provide a means for better control of the resulting signal spectrum as the power spectral density $\Phi_{n,m}(x)$, where x is a generalised frequency variable, of a BOC spreading symbol modulation is fully defined by the equation:

$$\Phi_{n,m}(x) = \frac{2\pi}{m\omega_0} \cdot \left\{ \frac{\sin\left(\frac{\pi x}{2n}\right)\cdot\sin\left(\frac{\pi x}{m}\right)}{\left(\frac{\pi x}{m}\right)\cdot\cos\left(\frac{\pi x}{2n}\right)} \right\}^2$$

where $x = \omega/\omega_0$

In a subset of the multi-level digital waveforms used as spreading symbol modulation waveforms, a specific category has been recognised that has attracted the name Composite BOC (CBOC) as can be appreciated from, for example, Avila-Rodriguez, J. A. et al, "*Revised Combined Galileo/GPS Frequency and Signal Performance Analysis*", Proceedings of Institute of Navigation Conference, 2005, 13-16 Sep. 2005, Long Beach, Calif., USA, which is incorporated herein by reference for all purposes, in which several Binary Offset Carrier signals are additively combined to form the spreading symbol modulation waveform.

A further option for spectrum control has also arisen that uses time-multiplexed techniques in which several BOC spreading symbol modulation waveforms are combined in a defined time sequence as can be appreciated from the above PCT application and Pratt, A. R., Owen, J. I. R., "*Signal Multiplex Techniques in Satellite Channel Availability, Possible Applications to Galileo*", GNSS 2005, Institute of Navigation Conference Record, pp 2448-2460, Sep. 13-16, 2005, Long Beach and Pratt, A. R. Owen, J. I. R., "*Galileo Signal Optimisation in L1*", Conference Record, National Technical Meeting, Institute of Navigation, pp 332-345, Jan. 24-26, 2005, San Diego. This technique assigns a specific spreading symbol modulation, drawn from a defined alphabet of such modulation waveforms, one to every spreading code element (or time slot—quantised by code element). Through the process of selecting which BOC modulation is used in which time slot, the relative proportions of each spreading symbol modulation component can be controlled. Only binary versions of this arrangement are known although it will be clear to those skilled in the art that multi-level equivalent arrangements are also possible that involve both time multiplexed techniques to determine which spreading symbol modulation is used in each time slot and the use of an alphabet of spreading symbol modulations that are multi-level and may be a combination of basic BOC spreading symbol waveforms. Such combinations may be in exemplary realisations either additive or multiplicative or some other means for combining the base modulation waveforms.

Multiplexed BOC

A proposal has been made for several satellite navigation systems to use a common modulation spectrum so that the signals/services maintain a degree of interoperability as can be appreciated from, for example, Hein, G. W. et al, *MBOC: The New Optimized Spreading Modulation for GALILEO L1 OS and GPS L1C*, Conference Record, IEEE PLANS/IoN National Technical Meeting, San Diego, April 2006, Session C5 Paper 7. The common spectrum does not require different satellite navigation systems to emit waveforms that are identical. The disclosed common spectrum, known as multiplex BOC or MBOC, may be attained by either a time multiplex technique or by the superposition (addition) of the required BOC components. The time multiplex technique, using binary offset carriers, has become known as TMBOC, whilst the superposition technique has become known as composite BOC, or by its initial letters, CBOC.

The time multiplex method of constructing a spreading symbol modulation waveform using BOC modulation components is illustrated in FIG. 2, which shows a pair of signals 200. An overall BOC signal or subcarrier 202 comprises a number 204 to 208 of bursts of a first spreading symbol modulation A, each burst of which has the duration of one chip of the spreading code. There may be several successive chips with this modulation. The overall MBOC 202 also comprises at least one burst 210 of a second, distinct, spreading symbol modulation B with similar characteristics but having a different carrier offset frequency. The depicted MBOC 202 also comprises a third spreading symbol modulation burst 212, which is identified as modulation type C with yet a further carrier offset frequency. In the known art, each of these modulation bursts has a BOC characteristic but with a common chip rate. Prior to transmission from a navigation satellite, the carrier signal and spreading symbol modulation are further modulated by a spreading code 214. It can be appreciated that only an exemplary number of chips, chip n to chip n+4, of the complete spreading code are illustrated. For the time multiplex technique with binary offset carrier spreading symbol modulation components, the relative magnitude of the components is determined by the proportion of time (in units of code sequence elements or chips) devoted to each. In the example of FIG. 2, the proportion allotted to the first spreading symbol modulation A is ⅗, to B is ⅕ and to C is ⅕, provided that this pattern were to continue ad infinitum. It will be clear to those skilled in the art that other proportions are possible within the restriction that the relative power of each component is set in multiples of 1/N, where N is the length of the repetitive spreading sequence. This restriction can be overcome also by having different time multiplex assignments for each repetition of the spreading sequence.

CBOC

The alternative formulation of the MBOC spectrum is by means of an additive method, whereby two time-continuous binary offset carrier spreading symbol modulation waveforms are additively combined. FIG. 3 provides an illustration 300 of the waveform produced using this method. First 302 and second 304 BOC components or waveforms are illustrated. The relative magnitudes of the two components 302 and 304 are controlled through the amplitudes of each of the BOC components. The first 302 BOC is the base-line BOC waveform, which is a BOC(1,1) waveform. The second waveform 304 illustrated a BOC(5,1) waveform. A number of chips, chip n to chip n+4, of a spreading code 306 is illustrated. The CBOC waveform 308 resulting from the additive combination of the first and second waveforms 302 and 304 is shown. It can be appreciated that CBOC waveform 308 comprises first and second components reflecting, respectively, their relationship to the first 302 and second 304 BOCs. The second component 310 is reduced in magnitude compared with the first component. For the 2 component CBOC waveform 308 shown, the resulting signal waveform has 4 levels. In general, a CBOC waveform has $2^n$ levels when derived from n BOC waveforms. Depending upon the relative amplitudes, it is possible that some of these levels may coincide.

Binary Offset Carrier Spreading Symbol Modulation

The conventional means of identifying the characteristics of binary offset carrier modulation is through 2 parameters n and m. The modulation is denoted BOC(n,m), in which n applies to the frequency of the offset carrier and m refers to the chipping rate. The parameters m and n are usually associated with a GPS-like signal in which the master satellite clock oscillates at 10.23 MHz or some multiple or fraction thereof. The parameters may then take on the meanings expressed by:

Offset carrier frequency=$n$×1.023 MHz

Chipping rate=$m$×1.023 M chips per second.

In the known implementation of a time multiplexed spectrum containing the two BOC modulation components, it is known that the phase of the spreading symbol modulation is identical at the transition to each code element (chip). For example, if the BOC spreading symbol modulation has a positive transition at the beginning of a specific code element, having the value +1, and a negative transition at the beginning of a specific code element, having the value −1, then these phase assignments may be applied to each spreading symbol in the complete sequence.

MBOC

One common power spectral density (PSD) that might be used by both Galileo and GPS navigation constellations is:

$$\Phi_{MBOC}(\omega) = \frac{10}{11} \cdot \Phi_{(1,1)}(\omega) + \frac{1}{11} \cdot \Phi_{(6,1)}(\omega) \quad (1)$$

In many satellite navigation systems, it is normal to transmit both a data-bearing signal and a 'so-called' pilot signal, which does not carry a data message. The data message is transmitted at a lower rate than the spreading code. For GPS CA code, the spreading code rate is 1.023 MHz whilst the data message is transmitted at 50 bits per second. In modernised GPS, both the pilot and data signals are transmitted although not necessarily at the same power levels. In the time multiplexed method of generating the MBOC spectrum, there are a wide range of options for choosing assignments for the division of power between the pilot and data channels. This permits the option of transmitting different relative proportions of power for each of the BOC spreading symbol components on the pilot and data-bearing signals. For example, if the two spreading symbol modulation components are BOC(1,1) and BOC(6,1), then the data-bearing signal, carrying a proportion γ of the total power, uses the BOC(1,1) spreading symbol modulation only whilst the pilot signal, carrying a proportion (1−γ) of the total power, would use a time multiplexed version having the power spectral density:

$$\Phi_{Pilot}(\omega) = \left(\frac{10}{11} - \gamma\right) \cdot \left(\frac{1}{1-\gamma}\right) \cdot \Phi_{(1,1)}(\omega) + \frac{1}{11}\left(\frac{1}{1-\gamma}\right) \cdot \Phi_{(6,1)}(\omega) \quad (2)$$

$$\Phi_{Data}(\omega) = \Phi_{(1,1)}(\omega)$$

This arrangement allows considerable freedom in selecting the proportions of power allocated to the data-bearing and pilot signals and in determining how the two BOC(n,m) components are distributed between these two signals. Equation (2) maintains the combined PSD for both pilot and data-bearing signals in accordance with the required MBOC PSD.

CBOC

For the Composite BOC method, the selection of parameters to provide for power division is more complex.

The equations that follow show the complexity associated with the control of the CBOC power spectral density. It is assumed that there are at least two components in the composite BOC spectrum. For illustrative purposes, the equations below are constructed for 2 components. However, those skilled in the art will recognise that more than 2 components may be used.

The spectrum of a binary offset carrier, BOC(n,m), with a sine phased spreading symbol modulation, is given in equation (3). Equation (3) shows the complex spectrum, $H_{n,m}(\omega)$, for values of (2n/m) that are even. This corresponds to (n/m) complete cycles of the binary offset carrier in each spreading code symbol. The complex spectrum is based on a calculation over the duration of a single code element, $\Delta T = 2\pi/(m\omega_0)$. The waveform used for the spectrum computations extends over the interval t∈(−ΔT/2, ΔT/2) and, for definition, has a positive transition at t=0.

$$H_{n,m}^{sin}(\omega) = \frac{2\pi \cdot (-1)^{(\frac{n}{m}+1)}}{jm\omega_0} \cdot \frac{\sin\left(\frac{\pi x}{2n}\right) \cdot \sin\left(\frac{\pi x}{m}\right)}{\left(\frac{\pi x}{m}\right) \cdot \cos\left(\frac{\pi x}{2n}\right)} \quad (3)$$

where $x = \omega/\omega_o$ and $\omega_0 = 2\pi \cdot 1.023 \cdot 10^6$

Note that the spectrum of the sine phase BOC(n,m) waveform, $H^{sin}_{n,m}(\omega)$, consists entirely of imaginary components due to the presence of the j ($=\sqrt{-1}$) term in the denominator.

Similarly, the spectrum of a binary offset carrier, BOC(n, m), with a cosine phased spreading symbol modulation, is given in equation (3-1). Equation (3-1) shows the complex spectrum, $H^{cos}_{n,m}(\omega)$, for values of (2n/m) that are even. This corresponds to (n/m) complete cycles of the binary offset carrier in each spreading code symbol. The complex spectrum is based on a calculation over the duration of a single code element, $\Delta T = 2\pi/(m\omega_0)$. The waveform used for the spectrum computations extends over the interval $t\epsilon(-\Delta T/2, \Delta T/2)$ and, for definition, has a positive dwell at t=0.

$$H_{n,m}^{cos}(\omega) = \frac{2\pi \cdot (-1)^{(\frac{n}{m}+1)}}{m\omega_0} \cdot \frac{\left(1-\cos\left(\frac{\pi x}{2n}\right)\right) \cdot \sin\left(\frac{\pi x}{m}\right)}{\left(\frac{\pi x}{m}\right) \cdot \cos\left(\frac{\pi x}{2n}\right)} \quad (3-1)$$

where $x = \omega/\omega_o$ and $\omega_0 = 2\pi \cdot 1.023 \cdot 10^6$

Note that the spectrum of the cosine phased BOC(n,m) waveform, $H^{cos}_{n,m}(\omega)$, consists entirely of real components.

The corresponding power spectral density (PSD) is given in equation (4) below and is averaged over 1 second assuming that each spreading code symbol takes a (binary) state selected randomly from the elements $\{+1,-1\}$. The PSD is:

$$\Phi_{n,m}(x) = \frac{2\pi}{m\omega_0} \cdot \left\{ \frac{\sin\left(\frac{\pi x}{2n}\right) \cdot \sin\left(\frac{\pi x}{m}\right)}{\left(\frac{\pi x}{m}\right) \cdot \cos\left(\frac{\pi x}{2n}\right)} \right\}^2 \quad (4)$$

As discussed above, in a composite binary offset carrier (BOC) signal, as an alternative to time multiplexing, the signal is formed through the additive combining of two or more BOC components for each spreading symbol. Thus, each spreading symbol has a spectrum containing, for a 2 component case, a portion a of a BOC(n,m) component and a portion β of a BOC(k,m) component. Notice that both components have the same spreading code (chip) frequency (same duration of spreading code element). The composite complex spectrum, $S_C(\omega)$, is then:

$$S_C(\omega) = H_{n,m}(\omega) + \beta \cdot H_{k,m}(\omega) \quad (5)$$

The corresponding power spectral density is formed from the product of $S_C(\omega)$ with its complex conjugate, and for real α, β:

$$\begin{aligned}\Phi_C(\omega) &= S_C^*(\omega) \cdot S_C(\omega) \quad (6)\\ &= |S_C(\omega)|^2 \\ &= (\alpha \cdot H_{n,m}^*(\omega) + \beta \cdot H_{k,m}^*(\omega)) \cdot (\alpha \cdot H_{n,m}(\omega) + \beta \cdot H_{k,m}(\omega)) \\ &= \alpha^2 \Phi_{n,m}(\omega) + \beta^2 \Phi_{k,m}(\omega) + \alpha\beta(H_{n,m}^* \cdot H_{k,m} + H_{n,m} \cdot H_{k,m}^*)\end{aligned}$$

where $\Phi_{n,m}(\omega) = H_{n,m}^*(\omega) \cdot H_{n,m}(\omega)$ and $\Phi_{k,m}(\omega) = H_{k,m}^*(\omega) \cdot H_{k,m}(\omega)$ Equation (6) clearly shows the differences in PSDs of the composite BOC (additive waveforms) and time multiplex approaches. The power spectral density, $\Phi_{TM}(\omega)$, for the time multiplex of BOC(n,m) and BOC(k,m) spreading symbol components, if the proportions are $\alpha^2$ and $\beta^2$, is:

$$\Phi_{TM}(\omega) = \alpha^2 \cdot \Phi_{n,m}(\omega) + \beta^2 \cdot \Phi_{k,m}(\omega) \quad (7)$$

Therefore, the time multiplex sequence comprises $\alpha^2/(\alpha^2+\beta^2)$ chips with a power spectral density of $\Phi_{n,m}(\omega)$ and $\beta^2/(\alpha^2+\beta^2)$ chips with a power spectral density of $\Phi_{k,m}(\omega)$. The difference between the PSDs for CBOC and TMBOC techniques reside in the presence of the cross spectral terms in the CBOC PSD, $\Phi_{cross}(\omega)$:

$$\Phi_{cross}(\omega) = \alpha\beta(H_{n,m}^* \cdot H_{k,m} + H_{n,m} \cdot H_{k,m}^*) \quad (8)$$

The situation is exacerbated when, for example, there are 3 components forming the composite signal. In the time multiplex realisation, the components are interspersed amongst the code elements in suitable numbers to establish the contributory proportions required from each in the power spectral density to be transmitted (more correctly at the time of signal generation as there are transmission filters in the satellites that control out of band emissions). A typical example has the proportions $\alpha^2$, $\beta^2$, $\delta^2$ for signals with each of three PSD's as equation (9) below illustrates.

$$\Phi_{TM}(\omega) = \alpha^2 \cdot \Phi_{n,m}(\omega) + \beta^2 \cdot \Phi_{k,m}(\omega) + \delta^2 \cdot \Phi_{l,m}(\omega) \quad (9)$$

The corresponding spectrum for the additive method of producing a 3 component composite BOC signal has three cross spectral terms of the form of equation (9).

$$\begin{aligned}\Phi_C(\omega) &= S_C^*(\omega) \cdot S_C(\omega) \quad (10)\\ &= (\alpha \cdot H_{n,m}^*(\omega) + \beta \cdot H_{k,m}^*(\omega) + \delta \cdot H_{l,m}^*(\omega)) \cdot \\ &\quad (\alpha \cdot H_{n,m}(\omega) + \beta \cdot H_{k,m}(\omega) + \delta \cdot H_{l,m}(\omega)) \\ &= \alpha^2 \Phi_{n,m}(\omega) + \beta^2 \Phi_{k,m}(\omega) + \delta^2 \Phi_{l,m}(\omega) + \\ &\quad \alpha\beta(H_{n,m}^* \cdot H_{k,m} + H_{n,m} \cdot H_{k,m}^*) + \\ &\quad \alpha\delta(H_{n,m}^* \cdot H_{l,m} + H_{n,m} \cdot H_{l,m}^*) + \\ &\quad \beta\delta(H_{k,m}^* \cdot H_{l,m} + H_{k,m} \cdot H_{l,m}^*)\end{aligned}$$

where $\Phi_{n,m}(\omega) = H_{n,m}^*(\omega) \cdot H_{n,m}(\omega)$ $\Phi_{k,m}(\omega) = H_{k,m}^*(\omega) \cdot H_{k,m}(\omega)$ $\Phi_{l,m}(\omega) = H_{l,m}^*(\omega) \cdot H_{l,m}(\omega)$ The cross-spectral terms in equation (10) have a significant influence on the transmitted PSD. Clearly, the presence of the cross spectral terms hinders the realisation of a common PSD for CBOC and MBOC.

It is an object of embodiments of the present invention to at least mitigate one or more problems of the prior art.

SUMMARY OF THE INVENTION

Accordingly, embodiments of the present invention provide a method of generating a signal comprising the steps of generating at least first and second portions of the signal; the first portion being derived from, or at least having characteristics of, at least first respective portions of at least first and second signals having a first phase state and the second portion being derived from, or having characteristics of, at least second respective portions of said at least first and second signals having a second phase state that is complementary to the first phase state.

Advantageously, when averaged over, for example, two chips or some other time period or interval, the composite complex spectrum for the combination of the two modulating subcarriers comprises at least substantially reduced, and preferably substantially eliminated, cross spectral terms. This allows, for example, the spectrum of a modulating subcarrier such as, for example, a composite BOC signal, to have substantially the same power spectral density (PSD) as a different modulating subcarrier such as, for example, a time division multiplex BOC when considered in terms of whether or not the power spectra of both comprise cross spectral terms.

A further embodiment provides a method of generating a CBOC waveform or spreading modulation waveform from first and second BOC waveforms, the CBOC waveform having a predetermined power spectral density comprising at least reduced cross spectral terms of the power spectral densities of the first and second BOC waveforms averaged over at least two predetermined time intervals such as, for example, at least two chips; the method comprising the steps of arranging for the states of the first and second BOC signals over a subsequent predetermined time interval of the at least two predetermined time intervals to be complementary to the states of the first and second BOC signals over a current predetermined time interval of the at least two predetermined time intervals.

Another embodiment provides a signal generator comprising means to generate at least a subsequent portion of a signal relative to at least a current portion of a signal; the current portion being derived from, or at least having characteristics of or associated with, at least current respective portions of at least first and second signals having a first phase state, the means to generate comprising means to combine at least subsequent portions of the at least first and second signals having a phase state that is complementary to the first phase state.

An embodiment provides a signal generator for generating a CBOC waveform from first and second BOC waveforms, the CBOC waveform having a predetermined power spectral density comprising at least reduced cross spectral terms of the power spectral densities of the first and second BOC waveforms averaged over at least two predetermined time intervals; the generator comprising means to arrange for the states of the first and second BOC signals over a subsequent predetermined time interval of the at least two predetermined time intervals to be complementary to the states of the first and second BOC signals over a current predetermined time interval of the at least two predetermined time intervals.

Embodiments provide a signal comprising at least a subsequent portion of the signal relative to at least a current portion of the signal; the current portion being derived from, or having characteristics of or associated with, at least current respective portions of at least first and second signals having a first phase state such that the phase state of at least subsequent portions of the at least first and second signals associated with said at least a subsequent portion is complementary to the first phase state.

Embodiments of the present invention can be realised in the form of hardware, software or a combination thereof. Suitably, an aspect of embodiments of the present invention provides a computer program comprising executable instructions for implementing a method, system, apparatus, generator or generating a signal according to embodiments of the invention. Furthermore, such a computer program can be stored using any form of storage such as, for example, optically or magnetically readable media, chips, ROMs, PROMs and other volatile or non-volatile devices. Suitably, embodiments of the present invention provide machine-readable storage storing such a computer program.

In current proposals between several different navigation satellite operators (such as USA with GPS and the European Union with Galileo), there are public documents that give effect to a recommendation by mutual technical working groups to use a common PSD for each system's emissions in the L1 RNSS band. This may not require the implementation of the same time waveform. Embodiments of the present invention allow the above common PSD for each system's emissions in the L1 RNSS band to be realized.

In a further aspect of the invention, a second method is used to eliminate the cross spectral term in equation 6. This has the same effect as the other methods but is an alternative implementation. The cross spectral term, $\Phi_{cross}(\omega)$, can be set to zero if the following condition is met:

$$(H_{n,m}{}^* \cdot H_{k,m} + H_{n,m} \cdot H_{k,m}{}^*) = 0 \text{ or equivalently}$$

$$H_{n,m}{}^* \cdot H_{k,m} = -H_{n,m} \cdot H_{k,m}{}^*$$

This condition can be satisfied by having the BOC(n,m) spectra made up of purely imaginary components whilst the BOC(k,m) spectra consists of purely real components. Therefore, under such a condition the complex conjugate of $H^{sin}_{n,m}$, is $$H_{n,m}^{sin}{}^* = -H_{n,m}^{sin}$$

whilst the complex conjugate of $H^{cos}_{k,m}$ does not change sign:

$$H_{k,m}^{cos}{}^* = +H_{k,m}^{cos}$$

Note that the superscripts sin and cos have been added to define the phasing of the sub-carrier in the binary offset carrier spreading symbol modulation. This arrangement satisfies the condition required to eliminate the cross spectral term. This embodiment of the invention requires that the two BOC components have phasing substantially in quadrature, one being of sine phasing and the other component being of cosine phasing.

In a still further aspect of embodiments of the invention there are provided receiver architectures are identified for processing transmitted signals identified herein. Embodiments can be realised that have a single channel to processes all signal components substantially simultaneously. Alternatively, or additionally, embodiments can be realised that have multiple channels so that the individual signal components are processed separately by respective channels. One skilled in the art will realise that such processing may not necessarily be optimised to provide the maximum signal to noise ratio.

BRIEF DESCRIPTION OF THE DRAWINGS

Embodiments of the present invention will now be described, by way of example only, with reference to the accompanying drawings.

FIG. 2 depicts a known time division multiplexed binary offset carrier (MBOC);

FIG. 3 shows a known composite binary offset carrier (CBOC);

FIG. 4 shows a CBOC signal according to an embodiment of the present invention;

FIG. 5 illustrates a conventional schematic system for generating a CBOC waveform;

DESCRIPTION OF EMBODIMENTS

Figure 1:
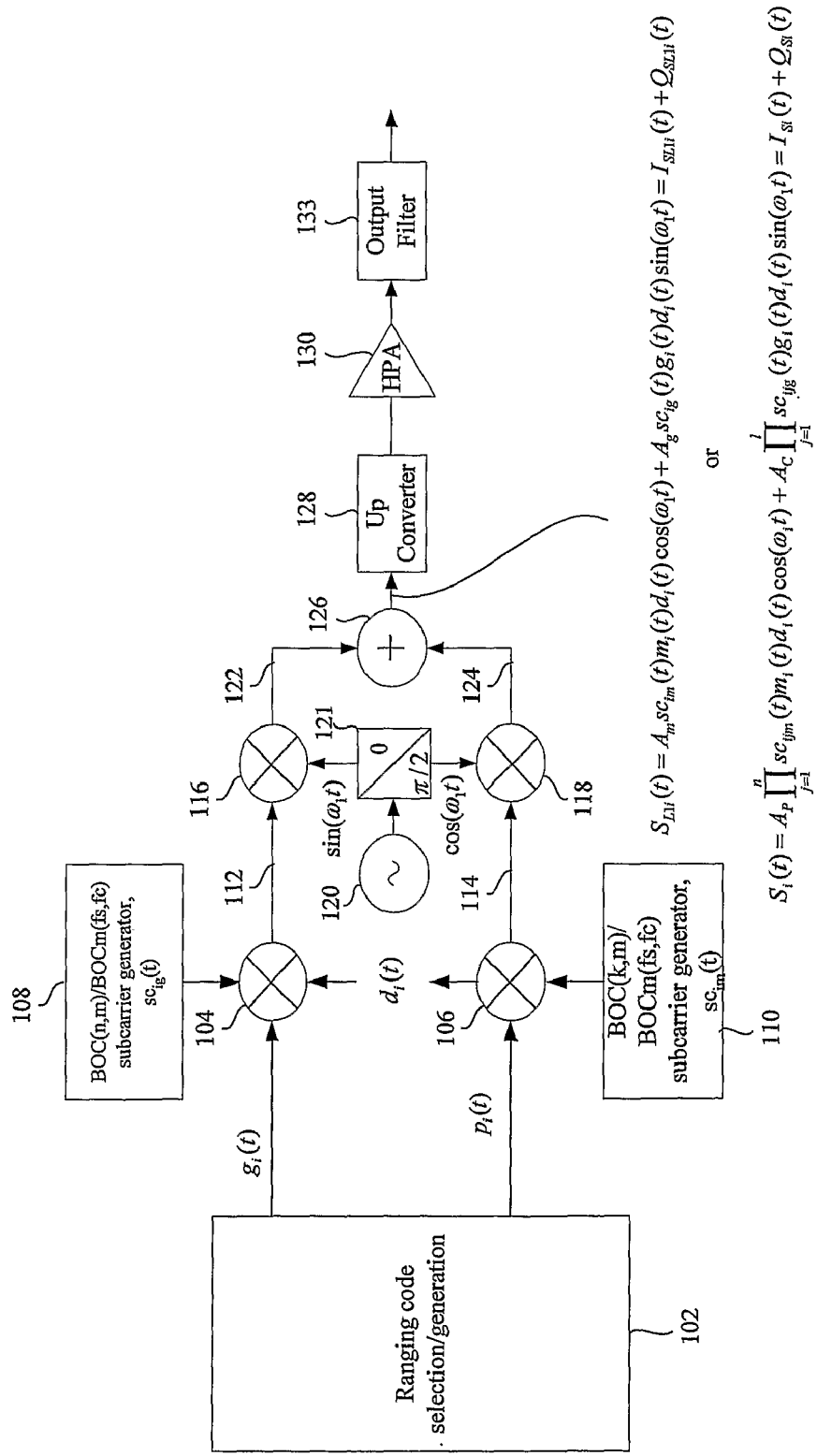
FIG. 1 illustrates a transmitter or signal generator.

Referring to FIG. 1, there is shown, schematically, a transmitter 100 according to an embodiment of the present invention. The transmitter 100 comprises means 102, that is, a generator, for generating or selecting ranging codes for transmission. It will be appreciated by those skilled in the art that such ranging codes may be generated by, for example, shift register implementations. An alternative to generation by means of a shift register may be through replaying the sequence of code states comprising the code sequence from a memory device adapted to continuously replay such sequences. It can be appreciated that the ranging code selection and/or generation means 102 is illustrated as producing $g_i(t)$ and $m_i(t)$. These codes are fed to respective mixers 104 and 106. The mixers 104 and 106 are arranged to combine the ranging codes with subcarriers according to embodiments of the present invention. Respective subcarrier generators 108 and 110 generate the subcarriers. Optionally, a data signal, $d_i(t)$, is also preferably mixed with the ranging codes and subcarriers. The duration of one bit of the data signal is normally an integer multiple of the code repetition interval. For example, in GPS CA code, it is 20 times the 1 ms code repetition interval, that is, the data rate is 50 bps. The mixed signals 112 and 114 are fed to a further pair of mixers 116 and 118, where they are mixed with in-phase and quadrature phase signals produced via an oscillator and phase shifter assembly 120 and 121. The further mixed signals 122 and 124 are combined, via a combiner 126, and are output for subsequent up conversion by an appropriate up converter 128. The output from the up converter 128 is fed to a high-power amplifier 130 and then filtered by an appropriate filter 133 for subsequent transmission by, for example, a satellite or other device arranged to emit or transmit the ranging codes.

In a preferred embodiment, the operation of the invention involves the sequencing of the relative phases of the binary offset carrier generators for the additive combining method in such a way as to provide a variety of different power spectral densities, one for each phase assignment. Such an assignment is, in the first instance, valid for the duration of a single code element or chip. Over the duration of several code elements, or over the complete code sequence, each possible phase assignment (and corresponding power spectrum) is generated a pre-defined number of times. The resulting power spectral density corresponds to the average PSD of all those generated. Therefore, it is possible to cancel the signals arising from the cross spectral terms in the resulting composite BOC spectrum. This operation can be performed with as many components as required in the composite BOC spectrum. Consequently, the average PSD may be arranged to be identical with that of the time multiplex arrangement of the BOC spreading symbol modulation.

For a two component composite, there are only two distinct phase assignments for $\alpha$ and $\beta$ as follows in table 1. The product of $\alpha$ and $\beta$ is identified as a 'phase assignment operator.

TABLE 1

| Phase Assignment of $\alpha$ and $\beta$ | | |
| --- | --- | --- |
| Phase | $\beta = +$ | $\beta = -$ |
| $\alpha = +$ | + | − |
| $\alpha = -$ | − | + |

According to this table, if half of the BOC(n,m) and BOC(k,m) are generated with the same phase assignment from the phase assignment operator ($\alpha\beta=+1$) and half with opposite phase from the phase assignment operator ($\alpha\beta=-1$), the average PSD is:

$$\Phi_C(\omega)|_{ave} = 0.5 \cdot S^*_{C++}(\omega) \cdot S_{C++}(\omega) + 0.5 \cdot S^*_{C+-}(\omega) \cdot S_{C+-}(\omega) \quad (11)$$

$$= 0.5 \cdot (|S_{C++}(\omega)|^2 + |S_{C+-}(\omega)|^2)$$

$$= \alpha^2 \Phi_{n,m}(\omega) + \beta^2 \Phi_{k,m}(\omega) +$$

$$0.5 \alpha\beta (H^*_{n,m} \cdot H_{k,m} + H_{n,m} \cdot H^*_{k,m}) -$$

$$0.5 \alpha\beta (H^*_{n,m} \cdot H_{k,m} + H_{n,m} \cdot H^*_{k,m})$$

$$= \alpha^2 \Phi_{n,m}(\omega) + \beta^2 \Phi_{k,m}(\omega)$$

As can be observed from equation (11), the phase assignment of the BOC generators controls the resulting spectrum. By allocating 50% to each phase assignment, the resulting cross spectral term is cancelled. The benefit of this arrangement is that the PSD of the composite BOC (additive combination) is composed just of the PSD's of each of the constituents only, and in whatever proportions ($\alpha,\beta$) are required. If required, a portion of the cross power spectral term could be retained through changing the proportions of the positive and negative phase assignment operator.

The definition of the phase of the BOC generators is made at the instant corresponding to the centre of the spreading code symbol modulation. The phase assignment is common to the complete spreading symbol. It corresponds to a common direction of the signal transition at the central instant of a spreading symbol as illustrated in FIG. 3 at 312 to 320. For a first preferred embodiment using 2 BOC generators, the spectrum of the output for a combined code and data state of $\{+1\}$, phase state of $\{+1\}$, is $$H_C(\omega) = \alpha \phi_n H_{n,m}(\omega) + \beta \phi_k H_{k,m}(\omega) \quad (12)$$

$$H_{n,m}(\omega) = \frac{2\pi \cdot (-1)^{(\frac{n}{m}+1)}}{jm\omega_0} \cdot \frac{\sin\left(\frac{\pi x}{2n}\right) \cdot \sin\left(\frac{\pi x}{m}\right)}{\left(\frac{\pi x}{m}\right) \cdot \cos\left(\frac{\pi x}{2n}\right)}$$

-continued $$H_{k,m}(\omega) = \frac{2\pi \cdot (-1)^{\left(\frac{k}{m}+1\right)}}{jm\omega_0} \cdot \frac{\sin\left(\frac{\pi x}{2k}\right) \cdot \sin\left(\frac{\pi x}{m}\right)}{\left(\frac{\pi x}{m}\right) \cdot \cos\left(\frac{\pi x}{2k}\right)}$$

where $x = \omega/\omega_o$ $\phi_n, \phi_k \in \{+1, -1\}$, and $\omega_0 = 2\pi \cdot 1.023 \cdot 10^6$ and the corresponding PSD is:

$$\Phi_C(\omega) = (\alpha \cdot \phi_n H_{n,m}^*(\omega) + \beta \cdot \phi_k H_{k,m}^*(\omega)) \cdot \quad (13)$$
$$(\alpha \cdot \phi_n H_{n,m}(\omega) + \beta \cdot \phi_k H_{k,m}(\omega))$$
$$= \alpha^2 \Phi_{n,m}(\omega) + \beta^2 \Phi_{k,m}(\omega) +$$
$$\alpha\beta\phi_n\phi_k(H_{n,m}^* \cdot H_{k,m} + H_{n,m} \cdot H_{k,m}^*)$$

and where, as before, $\Phi_{n,m}(\omega) = H_{n,m}^*(\omega) \cdot H_{n,m}(\omega)$ $\Phi_{k,m}(\omega) = H_{k,m}^*(\omega) \cdot H_{k,m}(\omega)$ It can be observed from equation 11 that the presence of the phase assignment switches does not affect the presence, or signs, of the power spectral densities for the BOC(n,m) or BOC(k,m) components, $\Phi_{n,m}(\omega)$, $\Phi_{k,m}(\omega)$. However, the product of the phase assignments, $\phi_n\phi_k$, which can take the values of +1 or −1, controls the sign of the cross spectral term. Consequently, by selecting phase assignment settings that cause the phase term to be positive or negative, power spectral densities as in equation 12 may be formed as follows.

$$\text{for } \phi_n, \phi_k = +1, +1 \text{ or } \phi_n, \phi_k \quad (14)$$
$$= -1, -1$$
$$\Phi_C^{++}(\omega) = \Phi_C^{--}(\omega)$$
$$= (\alpha \cdot \phi_n H_{n,m}^*(\omega) + \beta \cdot \phi_k H_{k,m}^*(\omega)) \cdot$$
$$(\alpha \cdot \phi_n H_{n,m}(\omega) + \beta \cdot \phi_k H_{k,m}(\omega))$$
$$= \alpha^2 \Phi_{n,m}(\omega) + \beta^2 \Phi_{k,m}(\omega) +$$
$$\alpha\beta(H_{n,m}^* \cdot H_{k,m} + H_{n,m} \cdot H_{k,m}^*)$$
$$\text{for } \phi_n, \phi_k = +1, -1 \text{ or } \phi_n, \phi_k$$
$$= -1, +1$$
$$\Phi_C^{+-}(\omega) = \Phi_C^{-+}(\omega) = \alpha^2 \Phi_{n,m}(\omega) + \beta^2 \Phi_{k,m}(\omega) -$$
$$\alpha\beta(H_{n,m}^* \cdot H_{k,m} + H_{n,m} \cdot H_{k,m}^*)$$

Thus, by combining an equal number of signals with each of the PDS's in equation 12 and having substantially complementary phase assignments, it can be arranged that the PSD of the combined signal, after averaging over an interval, exhibits no cross spectral terms. Alternatively, by similar combining with an unequal number of terms, a required percentage of the cross spectral term can be retained.

There are a number of ways in the BOC signals can be processed to have equal (or if required, unequal) numbers of complementary phase assignments.

A first embodiment uses a phase alternation approach whereby the initial phase of one of the BOC(n,m) and BOC (k,m) signals is alternated for each chip of the spreading code signal. In this case, the averaging interval is just 2 code chips as there will have been one chip where the spectrum has the characteristic of $\Phi^{++}_C(\omega)$ or $\Phi^{--}_C(\omega)$ and one chip with the spectrum of $\Phi^{+-}_C(\omega)$ or $\Phi^{-+}_C(\omega)$.

Referring to FIG. 4, there is shown a number of waveforms 400 for generating a CBOC waveform 402 having a power spectral density with substantially zero cross spectral terms that usually arise when combining a first BOC(n,m) waveform 404 and a second BOC(k,m) waveform 406. In the illustrated embodiment, the first BOC of waveform 404 is a BOC (1, 1). However, it can be appreciated that other BOC waveforms can equally well be used. The second BOC waveform 406 is a BOC (5, 1). However, again, it will be appreciated that other BOC waveforms can be used to realise embodiments of the present invention such as, for example, those described in the above referenced technical papers and international patent application. Embodiments of the invention are not limited to either BOC(1,1) or BOC(5,1). In the following examples, BOC(6,1) will be used instead of BOC (5,1).

FIG. 4 comprises a number of the dotted lines 408 to 416 that represent pre-determinable points of the waveforms 404 and 406. It can be appreciated that, for the purposes of illustration only, the dotted lines 408 to 416 are shown as being at the midpoint of the BOC chips. It can be appreciated that the negative going transition within the first chip, chip n, is coincidental with a negative going transition within the first chip period of the second BOC waveform 406. For the purposes of the present application, such an alignment and agreement of transitions of the BOC waveforms 404 and 406 at the pre-determinable points, that is, the midpoints in the present embodiment, is such that the waveforms are said to be in phase or to have the same phase state or condition. Therefore, a negative going transition of the first BOC waveform 404 coinciding with a negative going transition of the second BOC waveform 406 are said to be in phase or to have a (−, −) phase state or condition. The converse is also true, that is, coincident positive going transitions are also said to be in phase or to have a (+, +) phase state or condition. It should be noted for the purposes of the present application that the phase states (+, +) and (−, −) are substantially identical. Coincidence between a positive going transition of the first BOC waveform 404 and a negative going transition of the second BOC waveform 406 are such that the first and second BOC waveforms 404 and 406 are said to be out of phase or in anti-phase. The corresponding phase state or condition is (+, −). The converse is also true, that is, a negative going transition of the first BOC waveform 404 and a positive going transition of the second BOC waveform 406 are said to have a phase state or condition (−, +) and the first and second BOC waveforms 404 and 406 are said to be out of phase or in anti-phase. It can be appreciated from the illustrated embodiment that none of the BOC waveforms for the illustrated chip periods are out of phase. All have a (+,+) phase state. Those skilled in the art will recognise that the equivalent of such phase changes from (+,+) to (−,−) and from (+,−) to (−,+) can also occur as a result of changes in the spreading code state 420 or data symbol state 422.

Additively combining the first and second BOC waveforms 404 and 406 would, but for the present invention clearly result in the waveform 308 shown in FIG. 3. However, signals according to a first embodiment of the present invention are arranged such that the cross spectral terms of the power spectrum of the summation of the first 404 and second 406 BOC waveforms for a number of given chips period are cancelled or averaged out by ensuring that the cross spectral terms of the power spectrum of the summation of the first 404 and second BOC waveforms of a subsequent chip period are complementary, that is, have phases arranged to at least reduce the effects of, and, preferably, to cancel substantially entirely, the former cross spectral terms. This is achieved by ensuring that the first 404 and second 406 BOC waveforms of the subsequent chip period have the opposite phase state or condition to the phase state or condition of the BOC waveforms 404 and 406 of an earlier chip period.

This is achieved in the illustrated embodiment by the second BOC waveform 406 such that the waveform shown in 418 results. Referring to the modified BOC waveform 418 and the first BOC waveform 404, it can be appreciated that the phase states or conditions alternate between in phase, that is, (+, +), and out of phase or anti-phase, that is, (+, −). Therefore, combining the first of BOC waveform 404 and the modified second BOC waveform 418 produces the composite BOC waveform 402 with a desirable power spectral density. The power spectral density of the CBOC does not contain cross spectral terms relating to the first BOC waveform 404 and the second BOC waveform 406. Therefore, it can be appreciated that the power spectral density of the CBOC waveform 402 substantially corresponds to that of an MBOC signal.

In general, providing that, on average, the in phase portions of the first 404 and second 406 BOC waveforms are balanced by an equal or corresponding number of out of phase portions of the first 404 and the second 406 BOC waveforms, there should be a zero net cross product contribution to the power spectral density.

FIG. 5 shows a schematic system 500 for producing a composite BOC signal 502 according to the prior art. A pair of BOC waveforms 504 and 506, BOC (n,m) and BOC (k,m), optionally scaled, via scalers 508 and 510, prior to combining, are combined using an adder 512. A multiplier 514 is used to combine the BOC subcarrier 502 (CBOC) with a spreading code 516. The power contributions of the pair of BOC waveforms are controlled by the scalers 508 and 510 using coefficients γ and (1−γ).

Figure 6:
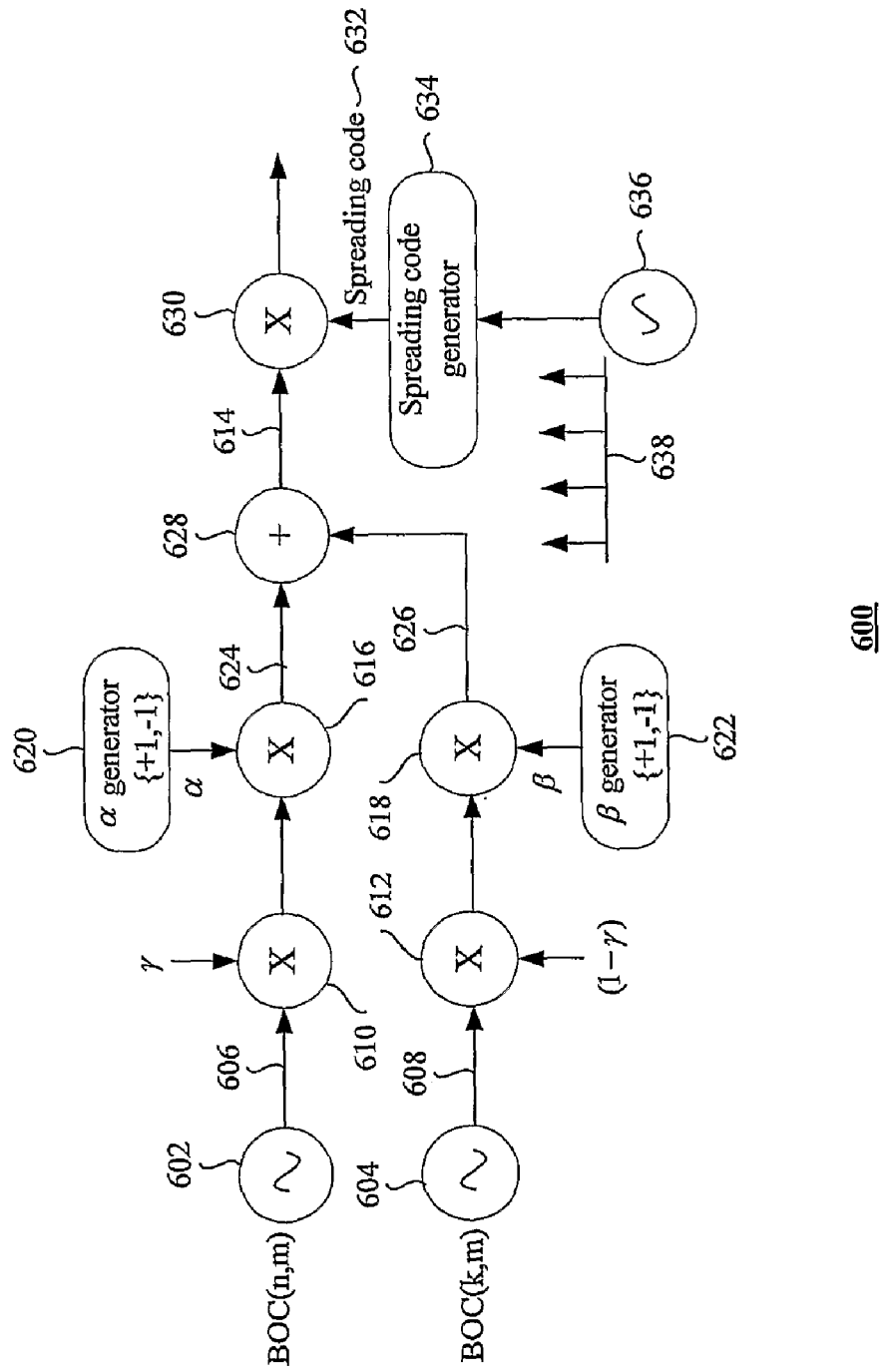
FIG. 6 depicts a schematic system for generating a CBOC waveform according to an embodiment of the present invention.

Referring to FIG. 6, there is shown a schematic system 600 for producing a CBOC waveform or spreading symbol modulation waveform according to an embodiment of the present invention. The system 600 comprises a pair of BOC waveform generators 602 and 604 for producing respective BOC waveforms, BOC(n,m) 606 and BOC(k,m) 608. Optionally, the waveforms 606 and 608 are scaled, via scalers 610 and 612 or some appropriate means, according to desired power contributions of the BOC waveforms 606 and 608 to the composite waveform 614, that is, to the CBOC waveform 614.

The inversion or change of phase state or condition of the BOC waveforms 606 and 608 is controlled by appropriate selection of the coefficients α and β together with respective multipliers 616 and 618 and generators 620 and 622. It will be appreciated that the system 600 illustrated represents the general case. In practice, only one of the BOC waveforms will be inverted at any one time and, accordingly, the first coefficient, α, for example, can generally be fixed or set to +1. The BOC waveforms 624 and 626 having selected phases are combined via an adder 628 to produce the CBOC waveform 614.

Typically, the CBOC waveform 614 is multiplied, via a multiplier 630, with a spreading waveform 632 produced via a spreading waveform generator 634. The spreading code generator 634 is driven by an oscillator or code chipping rate generator 636. Embodiments of the present invention can be realised in which at least one of the α and β generators are responsive to the code generator clock chipping rate 638 or multiples thereof.

Figure 7:
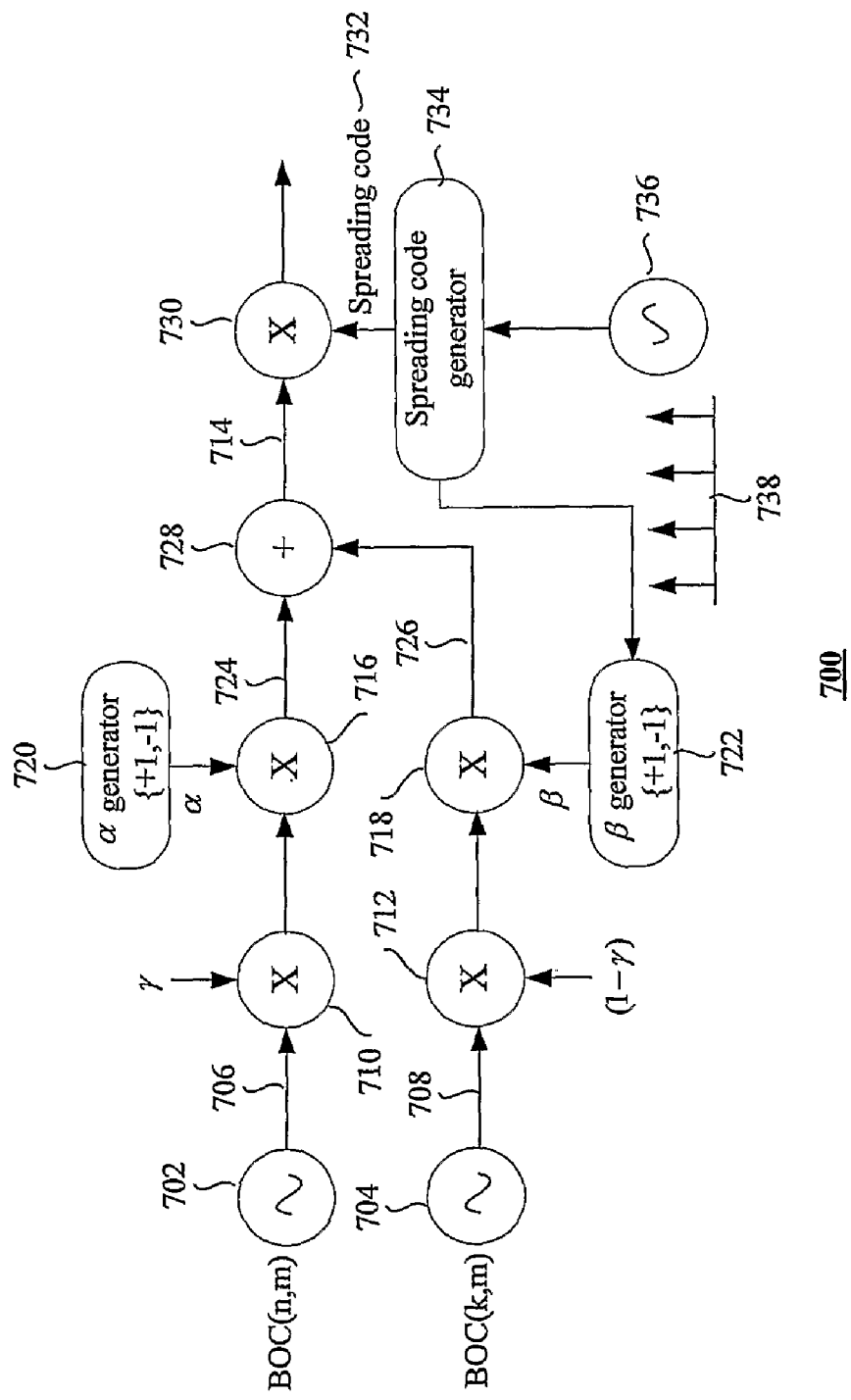
FIG. 7 depicts a schematic system to generate a CBOC waveform according to embodiments of the present invention that uses the spreading code epoch to control phase inversion.

Referring to FIG. 7, there is shown a schematic system 700 for producing a CBOC waveform or spreading symbol modulation waveform according to an embodiment of the present invention. The system is substantially similar to that described with reference to FIG. 6, but for the phase inversion or phase state/condition being controlled by or being responsive to the spreading waveform/code epochs. The system 700 comprises a pair of BOC waveform generators 702 and 704 for producing respective BOC waveforms, BOC(n,m) 706 and BOC(k,m) 708. Optionally, the waveforms 706 and 708 are scaled, via scalers 710 and 712 or some appropriate means, according to desired power contributions of the BOC waveforms 706 and 708 to the composite waveform 714, that is, to the CBOC waveform 714.

The inversion or change of phase state or condition of the BOC waveforms 706 and 708 is controlled by appropriate selection of the coefficients α and β together with respective multipliers 716 and 718 and generators 720 and 722. It will be appreciated that the system 700 illustrated represents the general case. In practice, only one of the BOC waveforms will be inverted at any one time and, accordingly, for example, the first coefficient, α, can generally be fixed or set to +1. The BOC waveforms 724 and 726 having selected phases are combined via an adder 728 to produce the CBOC waveform 714. Typically, the CBOC waveform 714 is multiplied, via a multiplier 730, with a spreading code 732 produced via a spreading code generator 734. The spreading code generator 734 is driven by an oscillator 736. The spreading code has an associated plurality of regularly spaced epochs 738. The sign, that is, {+1,−1}, of P is changed at the start of every code period, that is, every epoch, or code chip period. The duration of the states of β correspond to the duration of a code element or chip. However, embodiments can be realised in which the phase of the sign alternation can be set to occur other than at the start of every code period. Still further, embodiments can be realised in which the state of β changes at multiples or fractions of the code period.

Figure 8:
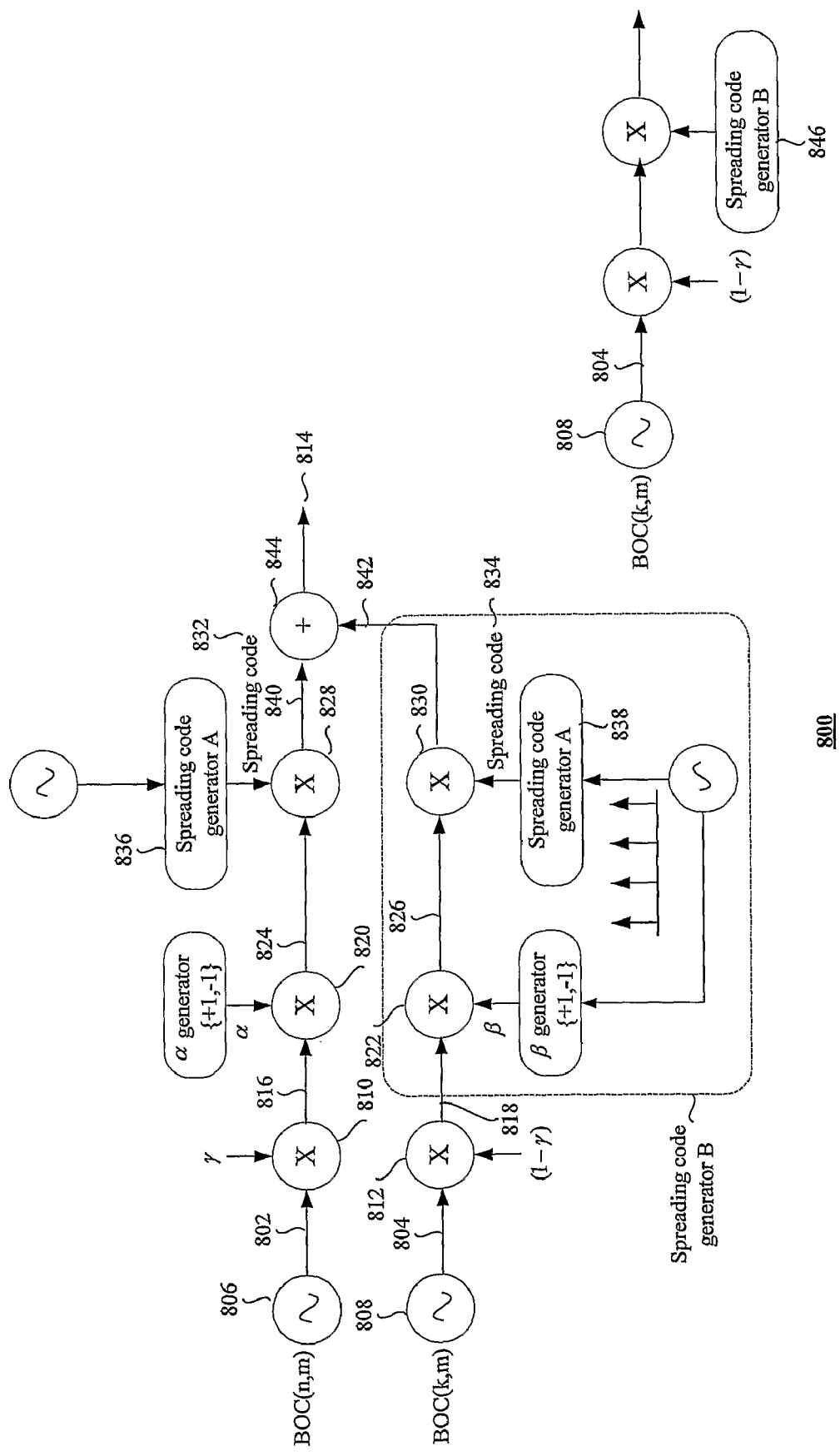
FIG. 8 depicts a variant of the schematic system for generating a CBOC waveform as illustrated in FIG. 7.

Referring to FIG. 8 there is depicted a schematic system 800 for generating a CBOC waveform according to an embodiment of the present invention. The system 800 is the linear system equivalent to that depicted in, and described with reference to, FIG. 7. Two BOC waveforms 802 and 804 are generated via respective BOC waveform generators 806 and 808. The waveforms 802 and 804 are optionally scaled, via scalers 810 and 812, according to desired respective power contributions to the CBOC waveform 814. The scaled BOC waveforms 816 and 818 are multiplied, via respective multipliers 820 and 822, by the α and β coefficients according to desired relative phases or phase states over at least a current chip, or other interval, as compared a phase state or condition of the BOC waveforms of over a previous chip or other interval. The resulting waveforms 824 and 826 are multiplied, via respective multipliers 828 and 830, by spreading waveforms 832 and 834 generated by respective spreading waveform generators 836 and 838. The CBOC waveform 814 is produced by summing the waveforms 840 and 842 using a combiner 844.

It should be noted that a second preferred embodiment may be realised by understanding that the combination of the spreading code generator 838 and the β generator can be replaced by a new spreading code generator producing sequence B, as opposed to sequence A. Accordingly, the combination of the β coefficient, multiplier 822, spreading waveform generator 838 and multiplier 830 can be replaced by a corresponding spreading code generator 846 as is shown in FIG. 8. This requires the spreading waveforms produced by the first and second spreading code generators 836 and 846 to be substantially statistically independent random waveforms such that, on average, the number of (+,+) and (−,−) phase states are balanced by the number of (+.−) and (−,+) phase states. If some proportion of the cross spectral terms are required, then the (+,+) and (−,−) phase states do not need to balance the number of (+,−) and (−,+) phase states. The desired proportion of the cross spectral terms is influenced by the level of imbalance.

Figure 9:
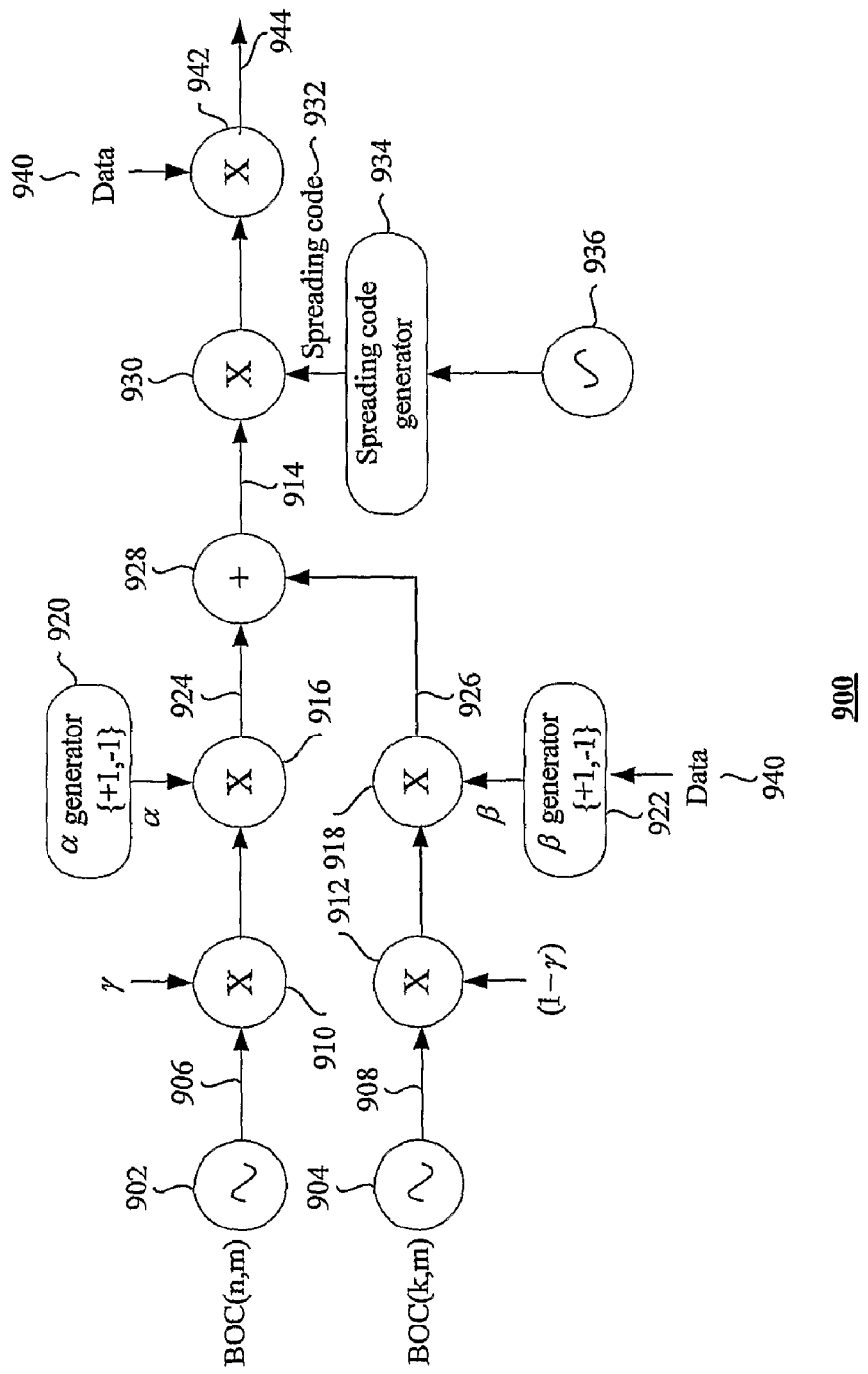
FIG. 9 shows a further embodiment of a schematic system for generating a spreading symbol modulation waveform according to an embodiment.

Referring to FIG. 9, there is shown a schematic system 900 for producing a spreading symbol modulation waveform according to an embodiment of the present invention. The system is substantially similar to that described with reference to FIG. 6, but for the phase inversion or phase state/condition being controlled by or being responsive to the data symbol period or multiples or fractions thereof. The system 900 comprises a pair of BOC waveform generators 902 and 904 for producing respective BOC waveforms, BOC(n,m) 906 and BOC(k,m) 908.

Optionally, the waveforms 906 and 908 are scaled, via scalers 910 and 912 or some appropriate means, according to desired power contributions of the BOC waveforms 906 and 908 to the composite waveform 914, that is, to the spreading symbol modulation waveform 914.

The inversion or change of phase state or condition of the BOC waveforms 906 and 908 is controlled by appropriate selection of the coefficients α and β together with respective multipliers 916 and 918 and generators 920 and 922. It will be appreciated that the system 900 illustrated represents the general case. In practice, only one of the BOC waveforms will be inverted at any one time and, accordingly, for example, the first coefficient, α, can generally be fixed or set to +1. The BOC waveforms, having selected or determined phases, 924 and 926 are combined via an adder 928 to produce the CBOC waveform 914. Typically, the CBOC waveform 914 is multiplied, via a multiplier 930, with a spreading code 932 produced via a spreading code generator 934. The spreading code generator 934 is driven by an oscillator 936. The sign, that is, {+1,−1}, of β is changed every data symbol period or multiples or fractions thereof.

The waveform resulting combination of the CBOC waveform 914 and the spreading waveform 932 is multiplied by a data signal 940 using a multiplier 942 to produce a combination of the CBOC waveform, the spreading code signal and the data signal.

It can be appreciated that embodiments can be realised that employ a separate code sequence for the BOC(n,m) and BOC(k,m) spreading symbol modulation. The duration of the code sequence is identical for the two spreading symbol modulations in this example but this is not necessary. For example, embodiments can be realised in which one of the spreading code generators has a period that is a multiple of the period of other spreading code generator. Furthermore, embodiments can be realised in which the lengths of the spreading code sequences do not have a rational number relationship. The spreading codes are normally selected from the same family but this is also not a necessity. In order to cause the average spectrum to exhibit substantially zero cross spectral terms, the two codes should have characteristics of independent random sequences so that their mutual cross correlation (at zero time offset) is substantially zero. This is true also for embodiments described with reference to FIGS. 6 to 8. The averaging time for the spectrum for the embodiments described with reference to FIG. 9 is the duration of the code sequence. If the two code generators have different sequence lengths, then a suitable averaging time can usually be found. In the limit, this would be a duration such that both of the sequences had returned to their respective starting positions (having a sequence length that is the lowest common multiple of the divisors of the individual sequence lengths). However, substantially acceptable results can usually be obtained for shorter intervals than the longest common multiple of the 2 code sequences.

Figure 10:
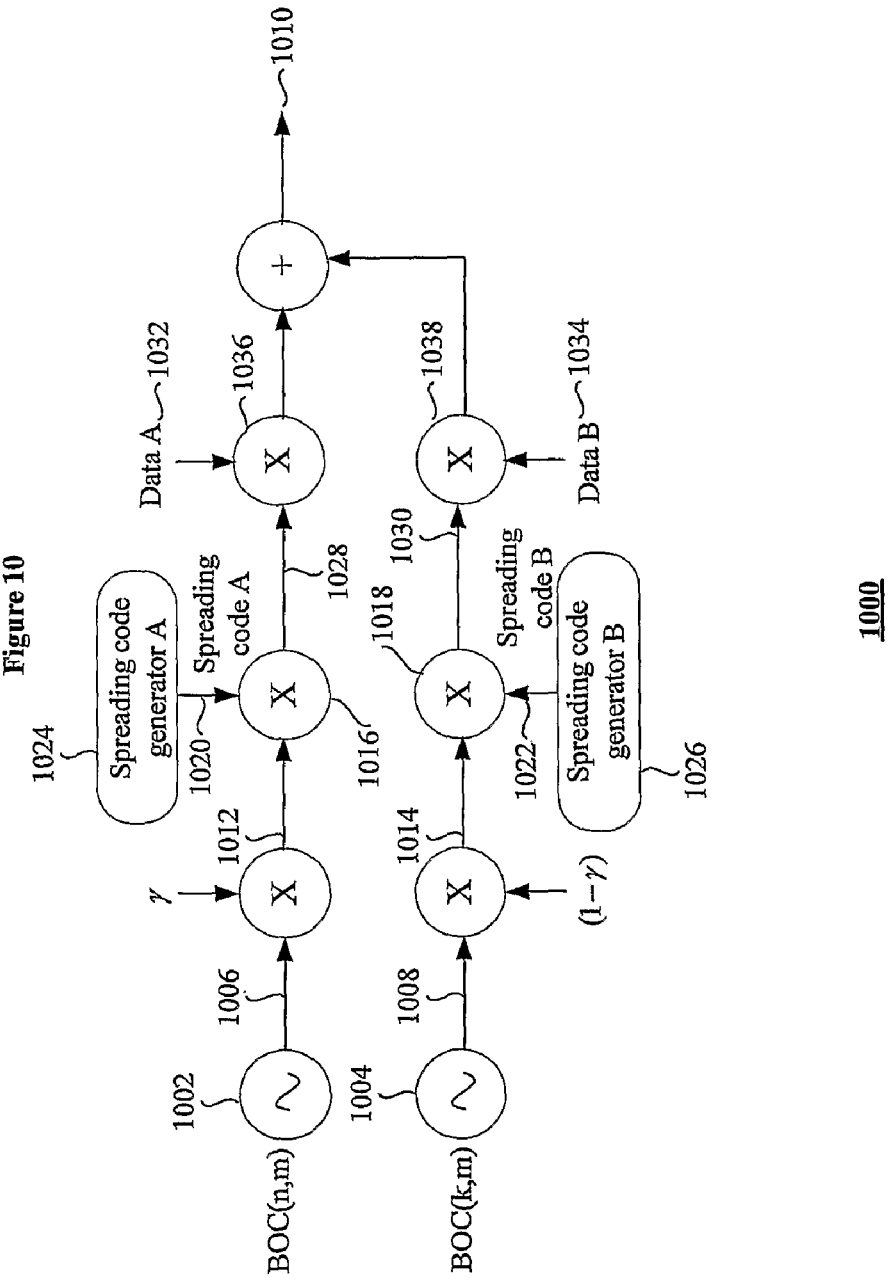
FIG. 10 illustrates a still further embodiment of a schematic system for generating a CBOC waveform.

Further embodiments can be realised that influence the correlation between the BOC(n,m) and BOC(k,m) spreading symbol modulation. This technique employs a (slow) binary data modulation combined, preferably multiplicatively, onto one of the spreading modulation components. This has the same effect as alternating the phase assignments as in above embodiments but over the much longer period of many data bit durations Such an embodiment is schematically depicted in FIG. 10. The system 1000 illustrated in FIG. 10 comprises first and second BOC waveform generators 1002 and 1004 producing respective BOC waveforms 1006 and 1008. The BOC waveforms, BOC(n,m) and BOC(k,m), are optionally scaled to determine their respective power contributions to the CBOC waveform 1010. The scaled waveforms 1012 and 1014 are combined, via respective multipliers 1016 and 1018, with respective spreading codes 1020 and 1022 produced via respective spreading code generators 1024 and 1026. The BOC waveforms, used as spreading symbol modulation waveforms, 1028 and 1030 are combined with respective data signals 1032 and 1034 to produce the overall combined spreading symbol, code symbol and data modulation waveform. This used as the base-band modulation for up-conversion to the desired carrier frequency for transmission. However, it is a condition that the data signals are sufficiently random to influence, and preferably eliminate, the cross spectral terms within the combined complex power spectrum.

Embodiments can be realised in which variable modulus signal and constant signal envelopes are used. It will be appreciated that any constraints that are aimed at preserving unitary or constant magnitude of $(I^2+Q^2)^{1/2}$ need not necessary apply if a variable modulus signal envelope is desired or is acceptable.

Figure 11:
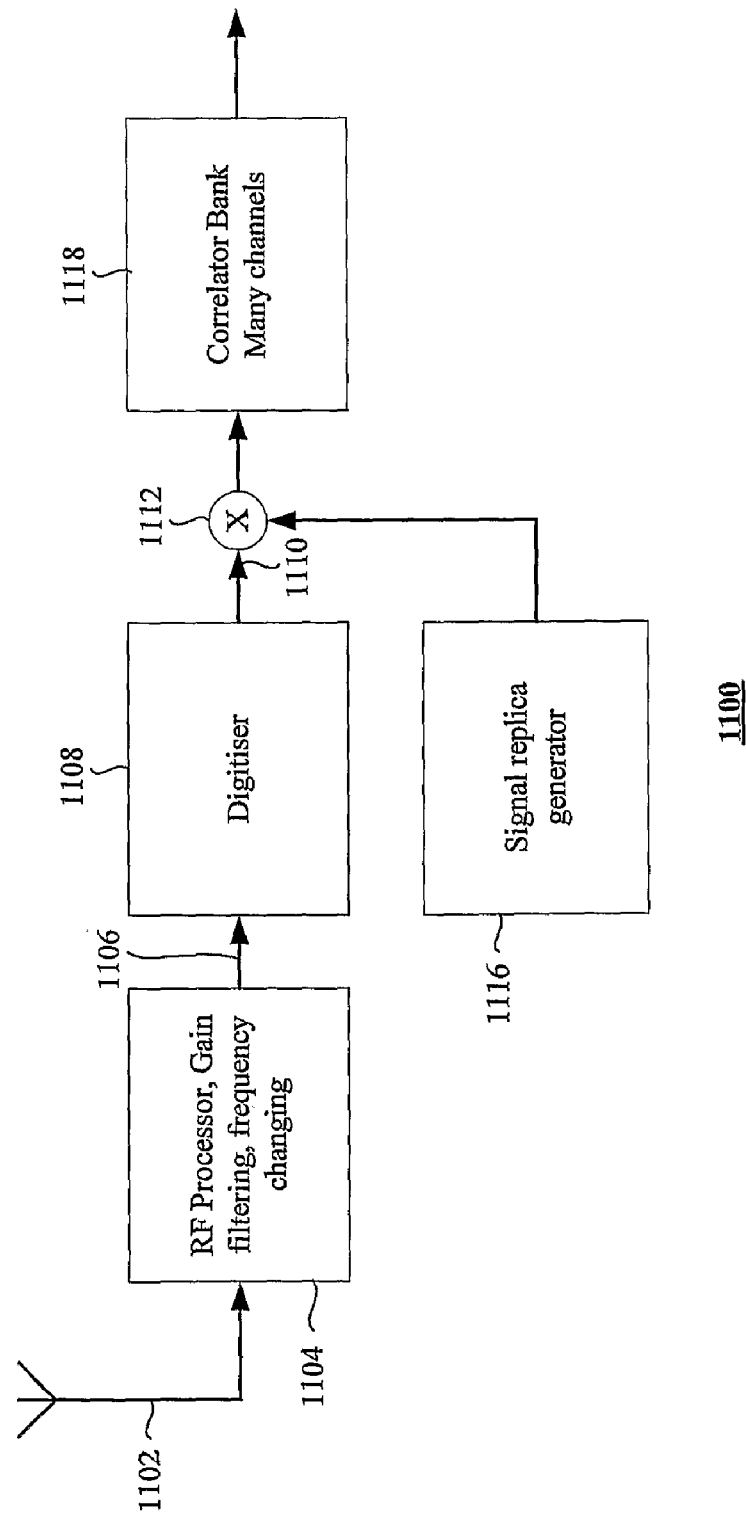

FIG. 11 shows an embodiment of a receiver 1100 adapted to process the signals arising from the transmission of multiplexed binary offset carrier signals. The signals transmitted from each satellite in the visible constellation are received at an antenna 1102, and are processed in an RF processor 1104, which amplifies, filters and frequency changes the signals as is known in the prior art. The output 1106 of the RF processor is connected to a digitiser 1108 that produces digitised received signal samples 1110.

The digitised received signal samples 1110 are applied in the exemplary embodiment to a correlation processor 1112, which correlates the digitised received signal samples 1110 with a group of replica signals 1114, produced by a signal replica generator 1116, in a correlation bank 1118. The specific form of the replica signals 1114 depends on the type of signals being received and the chosen option for subsequent processing. For example, for the Combined Binary Offset Carrier signal, known as CBOC, a multi-level replica signal may be used combining a residual carrier signal, a code signal and the binary subcarrier modulation. The code and binary subcarrier modulation are provided in early, prompt, very early, late and very late forms and with carrier signal versions being in both in-phase and quadrature relationship with a receiver carrier reference oscillator (not shown) that forms part of the signal replica generator, 1104.

Preferably, also included in the signal replica generator 1116, in addition to the carrier replica generator, are a code replica generator and a sub-carrier replica generator. The outputs of the individual elements of the replica generator are combined to form the said composite binary offset carrier signal.

In a separate aspect of the invention, an embodiment of a composite binary offset carrier signal can be realised as a time multiplexed signal whereby separate parts of the modulation are transmitted in a time sequence. One realisation of such a signal has two portions of a multilevel modulation waveform transmitted in a specific time sequence. Specific embodiments of such signals are shown in FIG. 12, where each signal has two components of the multilevel modulation waveform. The first of the replica waveforms 1202 is a tertiary spreading symbol consisting of the levels 0, +1, 0, −1, 0 in sequence. There are 3 spreading symbols illustrated in waveform 1202 representing the code elements +1, +1, −1. The vertical dashed lines indicate the boundaries between separate code elements. The second waveform 1204 is illustrative of a 5-level spreading symbol having the levels 0, +1, +2, +1, 0, −1, −2, −1, 0 for each spreading symbol. The code element assignments are identical with those in 1202. The third waveform 1206 in FIG. 12 represents a time multiplexed version of the second spreading symbol waveform 1204. In the third waveform 1206 the first 2 code elements are shown as tertiary waveforms and are representative of the {+1, 0, −1} components in waveform 1202. The third code element in the third waveform 1206 is representative of the outer levels of waveform 1204 at {+2, −2} but are transmitted after the first 2 code elements in the third code element position and with a −1 code element assignment. The fourth waveform 1208 in FIG. 12 is a replica based on the time multiplexing of two Binary Offset Carrier signals, BOC(n,m) and BOC(k,l). The first 2 code elements are illustrated with a BOC(1,1) spreading symbol whilst the subsequent two code elements are illustrated with a BOC(2,2) spreading symbol. The code assignments for code elements 3 and 4 are −1 and +1 respectively. The code element duration is not the same for each component in waveform 1208, at a rate of m×1.023 MHz and 1×1.023 MHz whilst the sub-carrier components are at different offsets from the carrier signal of n×1.023 MHz and k×1.023 MHz respectively. An exemplary replica signal is formed with these parts occupying different non-overlapping time segments of the transmitted waveform. The replica waveform follows an identical format in one embodiment.

Alternative embodiments employ the same general receiver format of FIG. 11, but split the components of the signal so that these are carried via separate connections to the correlator processor 1112, and the correlator bank 1118. In one embodiment, the replica signal components are generated continuously and are gated in time so that the replica signal generator 1116 only has signal outputs at the times corresponding those that are appropriate for each component. These signals may be binary, tertiary or have some other number of amplitude levels depending upon the complexity of the transmitted signal format. The additional processing step in the signal generator converting the continuous signals at the time of generation to the output format required uses a time gate that allows passage of the signal at the time when it is required and prevents passage to the output otherwise.

In an alternative embodiment, the signals may have the time gate removed, so that the signal components are continuously available at the input to the correlation processor. The performance of a receiver using the continuous replica versions of the composite signal may have sub-optimum performance but may offer savings in receiver complexity.

The above embodiments have been described with reference to the I and Q channels having the same chipping rates. However, embodiments are not limited to such arrangements. Embodiments can be realised in which different chipping rates are used.

Although embodiments of the present invention have been described with reference to the L1 and L2 frequencies, embodiments are not limited to such arrangements. Embodiments can be realised in which other frequencies or frequency bands can be used according to the requirements of the system using the invention. For example, the lower L band (i.e. E5a and E5b), the middle (i.e. E6) and upper L-band (i.e. E2-L1-E1) can also benefit from embodiments of the present invention. It will be appreciated that such embodiments may use signals having at least three components rather than the two components described above.

Furthermore, embodiments of the present invention have been described with reference to standard BOC. However, one skilled in the art appreciated that embodiments can also be realised using Alternative BOC.

Still further, it will be appreciated that embodiments can be realised in which the number of half cycles of a subcarrier per chip of a code can be at least one of odd, even, an integer multiple or a non-integer multiple of the chip, that is, there is a rational number relationship between the number of sub-carrier half cycles and the chip duration.

Embodiments of the present invention described above have focused on the transmission side of the invention, that is, upon the generation, modulation and transmission of signals such as, for example, spreading symbol modulation waveforms, composite signals, composite BOC signals, and ranging codes combined with a subcarrier or subcarriers and the like. However, one skilled in the art appreciates that a converse system, method, apparatus and receiver are required to receive and process the signals. Once one skilled in the art has designed a system for generating and transmitting such signals, designing an appropriate receiver is merely the converse of the transmit operations. Therefore, embodiments of the present invention also relate to systems, methods, apparatuses and receivers for processing signals such as those described above.

Although in the above mathematics relating to the above embodiments the superscripts "sin" and "cos" have been expressly used in some instances such as, for example, equations (3) and (3-1), it will be appreciated by those skilled in the art that they are equally applicable to those terms that do not expressly use them. It will also be appreciated that embodiments can be realised in which the "sin" and "cos" superscripts interchanged.

The above embodiments have been described with reference to additive combining of the BOC components. Embodiments are not limited to such arrangements. Embodiments can be realised in which some other form of combining is used. For example, multiplicative combining can be used as an alternative. A further alternative to additive or multiplicative combining might be an output from a logical network that processes a number of BOC inputs to produce a composite output, which can be a binary or multi-level output.

Although the above embodiments have been described with reference to the output of at least one of the α and β generators being a square waveform, embodiments are not limited thereto. For example, the β generator can be formed by the combination of spreading code generator A in combination with at least one further spreading code generator C.

The above embodiments have been described with to equal length spreading codes. However, embodiments are not limited thereto. For example, embodiments can be realised in which one of the spreading code generators has a period that is a multiple or sub-multiple of the spreading code period of another spreading code generator. Furthermore, embodiments can be realised in which the lengths of the spreading code sequences do not have a rational number relationship. For example, the lengths of the spreading code sequences may be prime numbers, products of prime numbers or multiples of either.

It will be appreciated that the above embodiments have been described without expressing the phase relationships between the spreading symbol modulation waveforms. Embodiments can be realised in which, in an exemplary case in which there are two spreading symbol modulations forming to composite BOC waveform (CBOC), the two spreading symbol waveforms have a quadrature phase relationship or some other "out of phase" phase relationship.

The invention claimed is:

1. A method of reducing cross spectral terms of a spreading waveform for a navigation signal; the method comprising: (a) generating at least first portions of first and second Binary Offset Carrier (BOC) signals, having respective complex spectrums, with respective power spectral densities such that the additive combination of the first portions of the first and second BOC signals results in a first composite power spectral density having a cross spectral term with a first phase assignment; (b) generating at least second portions of the first and second BOC signals, having respective complex spectrums, with respective power spectral densities such that the additive combination of the second portions of the first and second BOC signals results in a second composite power spectral density having a cross spectral term with a second phase assignment; the second phase assignment being complementary to the first phase assignment; and (c) producing the spreading waveform by additively averaging, over a predetermined time interval, a predetermined number of the at least first portions of the first and second BOC signals and a predetermined number of the at least second portions of the first and second BOC signals.

2. The method as claimed in claim 1 comprising the step of determining the first respective portions of said first and second BOC signals to have said first phase state according to predetermined transitions of current respective portions of said first and second BOC signals.

3. The method as claimed in claim 2 in which the predetermined transitions of at least current respective portions of first and second BOC signals are the same.

4. The method as claimed in claim 1 in which the at least current respective portions of said first and second BOC signals comprises a predetermined number of chips of the first and second BOC signals.

5. The method as claimed in claim 1 in which the first respective portions of said first and second BOC signals comprises a predetermined number of chips of the first and second BOC signals spanning a period of a spreading signal.

6. The method as claimed in claim 1 in which the first and second BOC signals comprise at least three signals.

7. An apparatus comprising means adapted to process a signal produced by a method as claimed in claim 1.

8. A non-transitory machine-readable storage storing a program comprising executable instructions to implement a method, system or apparatus, transmitter or receiver or to generate a signal as claimed in claim 1.

9. The method as claimed in claim 1 in which the said additive combination of the first respective portions of the first and second BOC signals are time multiplexed portions of the first and second BOC signals and in which said additive combination of the second respective portions of the first and second BOC signals are time multiplexed portions of the first and second BOC signals.

10. A method of generating a Composite Binary Offset Carrier (CBOC) waveform from first and second Binary Offset Carrier (BOC) waveforms, the CBOC waveform having a predetermined power spectral density comprising reduced cross spectral terms of the power spectral densities of the first and second BOC waveforms averaged over at least two predetermined time intervals (chip n; chip n+1); the method comprising the steps of arranging for the states of the first and second BOC waveforms over a subsequent predetermined time interval (chip n+1) of the at least two predetermined time intervals (chip n; chip n+1) to be complementary to the states of the first and second BOC waveforms over a current predetermined time (chip n) interval of the at least two predetermined time intervals (chip n; chip n+1).

11. The method as claimed in claim 10 in which the arranging is such that at least first and second complementary cross spectral terms of the power spectral densities of the first and second BOC waveforms over the at least two predetermined time intervals (chip n; chip n+1) are generated.

12. The method as claimed in claim 11 in which the predetermined power spectral density comprising at least reduced cross spectral terms of the power spectral densities of the first and second BOC waveforms averaged over at least two predetermined time (chip n; chip n+1) intervals comprises substantially zero cross spectral terms of the power spectral densities of the first and second BOC waveforms averaged over at least two predetermined time intervals (chip n; chip n+1).

13. A signal generator for generating a spreading waveform comprising: (a) a first generator to generate at least first portions of first and second Binary Offset Carrier (BOC) signals, having respective complex spectrums, with respective power spectral densities such that the additive combination of the first portions of the first and second BOC signals results in a first composite power spectral density having a cross spectral term with a first phase assignment; (b) a second generator to generate at least second portions of the first and second BOC signals, having respective complex spectrums, with respective power spectral densities such that the additive combination of the second portions of the first and second BOC signals results in a second composite power spectral density having a cross spectral term with a second phase assignment; the second phase assignment being complementary to the first phase assignment; and (c) an adder to produce the spreading waveform by additively averaging, over a predetermined time interval, a predetermined number of the at least first and a predetermined number of the at least second portions of the first and second BOC signals.

14. The signal generator as claimed in claim 13 comprising means to determine the first current respective portions of said first and second BOC signals as having said first phase state according to predetermined transitions of first respective portions of the first and second BOC signals.

15. The signal generator as claimed in claim 14 in which the predetermined transitions of first respective portions of said first and second BOC signals are the same.

16. The signal generator as claimed in claim 13 in which the first respective portions of the first and second BOC signals comprises a predetermined number of chips of the first and second BOC signals.

17. The signal generator as claimed in claim 13 in which the first respective portions of the first and second BOC signals comprises a predetermined number of chips of the first and second BOC signals spanning a period of a spreading signal.

18. The signal generator as claimed in claim 13 in which the first and second BOC signals comprise at least three signals.

19. An apparatus comprising means adapted to process a signal produced by a single generator as claimed in claim 13.

20. The signal generator as claimed in claim 13 in which said additive combination of the first respective portions of the first and second BOC signals are time multiplexed portions of the first and second BOC signals and in which said additive combination of the second respective portions of the first and second BOC signals are time multiplexed portions of the first and second BOC signal.

21. A signal generator for generating a Composite Binary Offset Carrier (CBOC) waveform from first and second Binary Offset Carrier (BOC) waveforms, the CBOC waveform having a predetermined power spectral density comprising reduced cross spectral terms of the power spectral densities of the first and second BOC waveforms averaged over at least two predetermined time intervals; the generator comprising means to arrange for the states of the first and second BOC signals over a subsequent predetermined time interval of the at least two predetermined time intervals to be complementary to the states of the first and second BOC signals over a current predetermined time interval of the at least two predetermined time intervals.

22. The signal generator as claimed in claim 21 in which the means to arrange is such that at least first and second complementary cross spectral terms of the power spectral densities of the first and second BOC waveforms over the at least two predetermined time intervals are generated.

23. The signal generator as claimed in claim 22 in which the predetermined power spectral density comprising reduced cross spectral terms of the power spectral densities of the first and second BOC waveforms averaged over at least two predetermined time intervals comprises substantially zero cross spectral terms of the power spectral densities of the first and second BOC waveforms averaged over at least two predetermined time intervals.

* * * * *